United States Patent
Kennedy et al.

(10) Patent No.: US 12,506,747 B1
(45) Date of Patent: Dec. 23, 2025

(54) MESSAGE CAMPAIGN AND MALICIOUS THREAT DETECTION

(71) Applicant: Agari Data, Inc., San Mateo, CA (US)

(72) Inventors: Scot Free Kennedy, San Francisco, CA (US); Ho Ming Gabriel Poon, San Francisco, CA (US); Siobhán McNamara, Mountain View, CA (US); Jacob Rudee Rideout, Raleigh, NC (US); Vidur Apparao, San Mateo, CA (US)

(73) Assignee: AGARI DATA, INC., San Mateo, CA (US)

( * ) Notice: Subject to any disclaimer, the term of this patent is extended or adjusted under 35 U.S.C. 154(b) by 324 days.

(21) Appl. No.: 16/828,712

(22) Filed: Mar. 24, 2020

Related U.S. Application Data

(60) Provisional application No. 62/826,569, filed on Mar. 29, 2019.

(51) Int. Cl.
*H04L 9/40* (2022.01)
*G06F 18/22* (2023.01)
*G06F 18/23* (2023.01)
*G06N 20/00* (2019.01)
*G06Q 10/107* (2023.01)
*H04L 51/212* (2022.01)
*H04L 51/42* (2022.01)

(52) U.S. Cl.
CPC .......... *H04L 63/1416* (2013.01); *G06F 18/22* (2023.01); *G06F 18/23* (2023.01); *G06N 20/00* (2019.01); *G06Q 10/107* (2013.01); *H04L 51/212* (2022.05); *H04L 51/42* (2022.05)

(58) Field of Classification Search
CPC ... H04L 63/1416; H04L 51/212; H04L 51/42; G06K 9/6215; G06K 9/6218; G06N 20/00; G06Q 10/107
See application file for complete search history.

(56) References Cited

U.S. PATENT DOCUMENTS

| | | | |
|---|---|---|---|
| 6,073,142 A | 6/2000 | Geiger et al. | |
| 6,161,130 A | 12/2000 | Horvitz et al. | |
| 6,574,658 B1 | 6/2003 | Gabber et al. | |
| 6,721,784 B1 | 4/2004 | Leonard et al. | |

(Continued)

FOREIGN PATENT DOCUMENTS

| JP | 2011100489 A | 5/2011 |
|---|---|---|
| WO | 2018213457 A1 | 11/2018 |

OTHER PUBLICATIONS

Peter Simons, "mapSoN 3.x User's Manual", downloaded from "https://web.archive.org/web/20140626054320/http:/mapson.sourceforge.net/", Jun. 26, 2014.

(Continued)

*Primary Examiner* — Suraj M Joshi
(74) *Attorney, Agent, or Firm* — Fredrikson & Byron, P.A.

(57) ABSTRACT

Information associated with a received message is received. It is determined whether the received message is a part of a group of related messages. Based on a determination that the received message is a part of the group of related messages, a security action for one or more messages of the group of related messages is performed. The group of related messages has been identified as malicious based at least in part on identified behavior detected based on a plurality of messages of the group of related messages.

18 Claims, 9 Drawing Sheets

(56) References Cited

U.S. PATENT DOCUMENTS

| | | |
|---|---|---|
| 7,194,618 B1 | 3/2007 | Suominen |
| 7,293,063 B1 | 11/2007 | Sobel |
| 7,299,261 B1 | 11/2007 | Oliver et al. |
| 7,305,445 B2 | 12/2007 | Singh et al. |
| 7,413,085 B2 | 8/2008 | Zager et al. |
| 7,464,408 B1 | 12/2008 | Shah et al. |
| 7,631,193 B1 | 12/2009 | Hoffman |
| 7,644,274 B1 | 1/2010 | Jakobsson et al. |
| 7,668,951 B2 | 2/2010 | Lund et al. |
| 7,748,038 B2 | 6/2010 | Olivier et al. |
| 7,797,752 B1 | 9/2010 | Vaidya et al. |
| 7,809,795 B1 | 10/2010 | Cooley et al. |
| 7,809,796 B1 | 10/2010 | Bloch et al. |
| 7,814,545 B2 | 10/2010 | Oliver et al. |
| 7,831,522 B1 | 11/2010 | Satish et al. |
| 7,854,007 B2 | 12/2010 | Sprosts et al. |
| 7,890,358 B2 | 2/2011 | Dutta et al. |
| 7,899,213 B2 | 3/2011 | Otsuka et al. |
| 7,899,866 B1 | 3/2011 | Buckingham et al. |
| 7,913,078 B1 | 3/2011 | Stewart et al. |
| 7,917,655 B1 | 3/2011 | Coomer et al. |
| 7,941,842 B2 | 5/2011 | Prince |
| 8,010,614 B1 | 8/2011 | Musat et al. |
| 8,131,655 B1 | 3/2012 | Cosoi et al. |
| 8,214,490 B1 | 7/2012 | Vos et al. |
| 8,230,505 B1 | 7/2012 | Ahrens et al. |
| 8,255,572 B1 | 8/2012 | Coomer |
| 8,365,258 B2 | 1/2013 | Dispensa |
| 8,489,689 B1 | 7/2013 | Sharma et al. |
| 8,560,962 B2 | 10/2013 | Wang et al. |
| 8,566,938 B1 | 10/2013 | Prakash et al. |
| 8,572,184 B1 | 10/2013 | Cosoi |
| 8,583,915 B1 | 11/2013 | Huang |
| 8,667,069 B1 | 3/2014 | Connelly et al. |
| 8,667,074 B1 | 3/2014 | Farkas |
| 8,667,581 B2 | 3/2014 | Steeves et al. |
| 8,676,155 B2 | 3/2014 | Fan et al. |
| 8,719,940 B1 | 5/2014 | Higbee et al. |
| 8,752,172 B1 | 6/2014 | Dotan et al. |
| 8,769,684 B2 | 7/2014 | Stolfo et al. |
| 8,813,228 B1 | 8/2014 | Magee et al. |
| 8,832,202 B2 | 9/2014 | Yoshioka |
| 8,880,604 B2 | 11/2014 | Chen et al. |
| 8,904,524 B1 | 12/2014 | Hodgman |
| 8,931,041 B1 | 1/2015 | Banerjee |
| 8,949,353 B1 | 2/2015 | Beguin |
| 8,959,163 B1 | 2/2015 | Ledet |
| 8,984,640 B1 | 3/2015 | Emigh et al. |
| 8,996,042 B1 | 3/2015 | Hannigan |
| 9,009,829 B2 | 4/2015 | Stolfo et al. |
| 9,027,134 B2 | 5/2015 | Foster et al. |
| 9,060,057 B1 | 6/2015 | Danis |
| 9,118,653 B2 | 8/2015 | Nimashakavi et al. |
| 9,154,514 B1 | 10/2015 | Prakash |
| 9,203,791 B1 | 12/2015 | Olomskiy |
| 9,245,115 B1 | 1/2016 | Jakobsson |
| 9,258,314 B1 | 2/2016 | Xiao et al. |
| 9,277,049 B1 | 3/2016 | Danis |
| 9,332,022 B1 | 5/2016 | Ashley |
| 9,338,026 B2 | 5/2016 | Bandini et al. |
| 9,338,287 B1 | 5/2016 | Russo |
| 9,471,714 B2 | 10/2016 | Iwasaki et al. |
| 9,473,437 B1 | 10/2016 | Jakobsson |
| 9,491,155 B1 | 11/2016 | Johansson et al. |
| 9,501,639 B2 | 11/2016 | Stolfo et al. |
| 9,560,506 B2 | 1/2017 | Gudlavenkatasiva et al. |
| 9,602,508 B1 | 3/2017 | Mahaffey et al. |
| 9,613,341 B2 | 4/2017 | Shivakumar |
| 9,654,492 B2 | 5/2017 | Maylor et al. |
| 9,686,308 B1 | 6/2017 | Srivastava |
| 9,747,455 B1 | 8/2017 | Mcclintock et al. |
| 9,781,149 B1 | 10/2017 | Himler et al. |
| 9,800,589 B1 | 10/2017 | Asveren et al. |
| 9,847,973 B1 | 12/2017 | Jakobsson et al. |
| 9,906,554 B2 | 2/2018 | Higbee et al. |
| 9,910,984 B2 | 3/2018 | Valencia et al. |
| 9,940,482 B1 | 4/2018 | Nichols et al. |
| 10,122,715 B2 | 11/2018 | Dispensa |
| 10,129,194 B1 | 11/2018 | Jakobsson |
| 10,277,628 B1 | 4/2019 | Jakobsson |
| 10,326,735 B2 * | 6/2019 | Jakobsson ............ H04L 63/0254 |
| 10,694,029 B1 | 6/2020 | Jakobsson |
| 10,805,270 B2 | 10/2020 | Jakobsson et al. |
| 2002/0138271 A1 | 9/2002 | Shaw |
| 2002/0184315 A1 | 12/2002 | Earnest |
| 2003/0009694 A1 | 1/2003 | Wenocur et al. |
| 2003/0023736 A1 | 1/2003 | Abkemeier |
| 2003/0200108 A1 | 10/2003 | Malnoe |
| 2003/0212791 A1 | 11/2003 | Pickup |
| 2003/0220978 A1 | 11/2003 | Rhodes |
| 2003/0225850 A1 | 12/2003 | Teague |
| 2003/0229672 A1 | 12/2003 | Kohn |
| 2003/0236845 A1 | 12/2003 | Pitsos |
| 2004/0015554 A1 | 1/2004 | Wilson |
| 2004/0073617 A1 | 4/2004 | Milliken et al. |
| 2004/0093371 A1 | 5/2004 | Burrows et al. |
| 2004/0148358 A1 | 7/2004 | Singh et al. |
| 2004/0176072 A1 | 9/2004 | Gellens |
| 2004/0177120 A1 | 9/2004 | Kirsch |
| 2004/0203589 A1 | 10/2004 | Wang et al. |
| 2004/0215977 A1 | 10/2004 | Goodman et al. |
| 2004/0249893 A1 | 12/2004 | Leeds |
| 2005/0021649 A1 | 1/2005 | Goodman et al. |
| 2005/0033810 A1 | 2/2005 | Malcolm |
| 2005/0060643 A1 | 3/2005 | Glass et al. |
| 2005/0076084 A1 | 4/2005 | Loughmiller et al. |
| 2005/0076240 A1 | 4/2005 | Appleman |
| 2005/0080856 A1 | 4/2005 | Kirsch |
| 2005/0080857 A1 | 4/2005 | Kirsch et al. |
| 2005/0091320 A1 | 4/2005 | Kirsch et al. |
| 2005/0097320 A1 | 5/2005 | Golan et al. |
| 2005/0125667 A1 | 6/2005 | Sullivan et al. |
| 2005/0182735 A1 | 8/2005 | Zager et al. |
| 2005/0188023 A1 | 8/2005 | Doan et al. |
| 2005/0188045 A1 | 8/2005 | Katsikas |
| 2005/0198173 A1 | 9/2005 | Evans |
| 2005/0216587 A1 | 9/2005 | John |
| 2005/0223076 A1 | 10/2005 | Barrus et al. |
| 2005/0235065 A1 | 10/2005 | Le et al. |
| 2005/0257261 A1 | 11/2005 | Shraim et al. |
| 2005/0283837 A1 | 12/2005 | Olivier et al. |
| 2006/0004772 A1 | 1/2006 | Hagan et al. |
| 2006/0004896 A1 | 1/2006 | Nelson et al. |
| 2006/0015563 A1 | 1/2006 | Judge et al. |
| 2006/0018466 A1 | 1/2006 | Adelstein et al. |
| 2006/0026242 A1 | 2/2006 | Kuhlmann et al. |
| 2006/0031306 A1 | 2/2006 | Haverkos |
| 2006/0031338 A1 | 2/2006 | Kang et al. |
| 2006/0037075 A1 | 2/2006 | Frattura et al. |
| 2006/0053279 A1 | 3/2006 | Coueignoux |
| 2006/0053490 A1 | 3/2006 | Herz et al. |
| 2006/0085505 A1 | 4/2006 | Gillum et al. |
| 2006/0101334 A1 | 5/2006 | Liao et al. |
| 2006/0107323 A1 | 5/2006 | Mclean |
| 2006/0143462 A1 | 6/2006 | Jacobs |
| 2006/0149821 A1 | 7/2006 | Rajan et al. |
| 2006/0153380 A1 | 7/2006 | Gertner |
| 2006/0161989 A1 | 7/2006 | Reshef et al. |
| 2006/0168024 A1 | 7/2006 | Mehr et al. |
| 2006/0168066 A1 | 7/2006 | Helsper et al. |
| 2006/0168329 A1 | 7/2006 | Tan et al. |
| 2006/0184635 A1 | 8/2006 | Owen et al. |
| 2006/0195542 A1 | 8/2006 | Nandhra |
| 2006/0206571 A1 | 9/2006 | Kuwahara |
| 2006/0206713 A1 | 9/2006 | Hickman et al. |
| 2006/0224673 A1 | 10/2006 | Stern et al. |
| 2006/0224677 A1 | 10/2006 | Ishikawa et al. |
| 2006/0230461 A1 | 10/2006 | Hauser |
| 2006/0253597 A1 | 11/2006 | Mujica |
| 2006/0259558 A1 | 11/2006 | Yen |
| 2006/0265498 A1 | 11/2006 | Turgeman et al. |
| 2006/0277259 A1 | 12/2006 | Murphy et al. |
| 2006/0282660 A1 | 12/2006 | Varghese et al. |
| 2007/0005717 A1 | 1/2007 | Levasseur et al. |

(56) References Cited

U.S. PATENT DOCUMENTS

| | | |
|---|---|---|
| 2007/0019235 A1 | 1/2007 | Lee |
| 2007/0027992 A1 | 2/2007 | Judge et al. |
| 2007/0035390 A1 | 2/2007 | Thomas et al. |
| 2007/0038718 A1 | 2/2007 | Khoo et al. |
| 2007/0050444 A1 | 3/2007 | Costea et al. |
| 2007/0067465 A1 | 3/2007 | Blinn et al. |
| 2007/0070921 A1 | 3/2007 | Quinlan et al. |
| 2007/0078936 A1 | 4/2007 | Quinlan et al. |
| 2007/0079379 A1 | 4/2007 | Sprosts et al. |
| 2007/0086592 A1 | 4/2007 | Ellison et al. |
| 2007/0100944 A1 | 5/2007 | Ford et al. |
| 2007/0101423 A1 | 5/2007 | Oliver et al. |
| 2007/0107053 A1 | 5/2007 | Shraim et al. |
| 2007/0130618 A1 | 6/2007 | Chen |
| 2007/0136573 A1 | 6/2007 | Steinberg |
| 2007/0136806 A1 | 6/2007 | Berman |
| 2007/0143407 A1 | 6/2007 | Avritch et al. |
| 2007/0143432 A1 | 6/2007 | Klos et al. |
| 2007/0162742 A1 | 7/2007 | Song et al. |
| 2007/0192169 A1 | 8/2007 | Herbrich et al. |
| 2007/0198642 A1 | 8/2007 | Malik |
| 2007/0208850 A1 | 9/2007 | Lin et al. |
| 2007/0208941 A1 | 9/2007 | Backer |
| 2007/0214495 A1 | 9/2007 | Royer et al. |
| 2007/0239639 A1 | 10/2007 | Loughmiller et al. |
| 2007/0271343 A1 | 11/2007 | George et al. |
| 2007/0276907 A1 | 11/2007 | Maes |
| 2007/0289018 A1 | 12/2007 | Steeves et al. |
| 2007/0299916 A1 | 12/2007 | Bates et al. |
| 2008/0004049 A1 | 1/2008 | Yigang et al. |
| 2008/0022013 A1 | 1/2008 | Adelman et al. |
| 2008/0022107 A1 | 1/2008 | Pickles et al. |
| 2008/0046970 A1 | 2/2008 | Oliver et al. |
| 2008/0050014 A1 | 2/2008 | Bradski et al. |
| 2008/0098237 A1 | 4/2008 | Dung et al. |
| 2008/0104180 A1 | 5/2008 | Gabe |
| 2008/0104235 A1 | 5/2008 | Oliver et al. |
| 2008/0141374 A1 | 6/2008 | Sidiroglou et al. |
| 2008/0175266 A1 | 7/2008 | Alperovitch et al. |
| 2008/0178288 A1 | 7/2008 | Alperovitch et al. |
| 2008/0184366 A1 | 7/2008 | Alperovitch et al. |
| 2008/0229416 A1 | 9/2008 | Stewart et al. |
| 2008/0235794 A1 | 9/2008 | Bogner |
| 2008/0244009 A1 | 10/2008 | Rand et al. |
| 2008/0256188 A1 | 10/2008 | Massand |
| 2008/0276315 A1 | 11/2008 | Shuster |
| 2008/0290154 A1 | 11/2008 | Barnhardt et al. |
| 2009/0037350 A1 | 2/2009 | Rudat |
| 2009/0064330 A1 | 3/2009 | Shraim et al. |
| 2009/0089859 A1 | 4/2009 | Cook et al. |
| 2009/0144382 A1 | 6/2009 | Benninghoff, III |
| 2009/0157708 A1 | 6/2009 | Bandini et al. |
| 2009/0210708 A1 | 8/2009 | Chou |
| 2009/0228583 A1 | 9/2009 | Pocklington et al. |
| 2009/0252159 A1 | 10/2009 | Awson et al. |
| 2009/0260064 A1 | 10/2009 | Mcdowell et al. |
| 2009/0292781 A1 | 11/2009 | Teng et al. |
| 2009/0319629 A1 | 12/2009 | De Guerre et al. |
| 2010/0005191 A1 | 1/2010 | Drako et al. |
| 2010/0030798 A1 | 2/2010 | Kumar et al. |
| 2010/0030858 A1 | 2/2010 | Chasin |
| 2010/0043071 A1 | 2/2010 | Wang |
| 2010/0054443 A1 | 3/2010 | Bhattiprolu et al. |
| 2010/0070761 A1 | 3/2010 | Gustave et al. |
| 2010/0077483 A1 | 3/2010 | Stolfo et al. |
| 2010/0082758 A1 | 4/2010 | Golan |
| 2010/0094887 A1 | 4/2010 | Ye et al. |
| 2010/0095374 A1 | 4/2010 | Gillum et al. |
| 2010/0115040 A1 | 5/2010 | Sargent et al. |
| 2010/0145900 A1 | 6/2010 | Zheng et al. |
| 2010/0198928 A1 | 8/2010 | Almeida |
| 2010/0235636 A1 | 9/2010 | Cohen |
| 2010/0257222 A1 | 10/2010 | Hamilton, II et al. |
| 2010/0281535 A1 | 11/2010 | Perry, Jr. et al. |
| 2010/0287246 A1 | 11/2010 | Klos et al. |
| 2010/0293382 A1 | 11/2010 | Hammad |
| 2010/0299399 A1 | 11/2010 | Wanser et al. |
| 2010/0313253 A1 | 12/2010 | Reiss |
| 2011/0061089 A1 | 3/2011 | O'Sullivan et al. |
| 2011/0066687 A1 | 3/2011 | Chen et al. |
| 2011/0087485 A1 | 4/2011 | Maude et al. |
| 2011/0113231 A1 | 5/2011 | Kaminsky |
| 2011/0145152 A1 | 6/2011 | Mccown |
| 2011/0191688 A1 | 8/2011 | Hasegawa et al. |
| 2011/0191847 A1 | 8/2011 | Davis et al. |
| 2011/0214187 A1 | 9/2011 | Wittenstein et al. |
| 2011/0271349 A1 | 11/2011 | Kaplan |
| 2011/0294478 A1 | 12/2011 | Trivi et al. |
| 2012/0030293 A1 | 2/2012 | Bobotek |
| 2012/0066498 A1 | 3/2012 | Engert |
| 2012/0084866 A1 | 4/2012 | Stolfo |
| 2012/0102566 A1 | 4/2012 | Vrancken et al. |
| 2012/0136780 A1 | 5/2012 | El-Awady et al. |
| 2012/0167233 A1 | 6/2012 | Gillum |
| 2012/0172067 A1 | 7/2012 | Gillin |
| 2012/0191615 A1 | 7/2012 | Schibuk |
| 2012/0192258 A1 | 7/2012 | Spencer et al. |
| 2012/0204032 A1 | 8/2012 | Wilkins et al. |
| 2012/0204221 A1 | 8/2012 | Monjas Llorente et al. |
| 2012/0227104 A1 | 9/2012 | Sinha et al. |
| 2012/0242488 A1 | 9/2012 | Wilson |
| 2012/0246725 A1 | 9/2012 | Osipkov |
| 2012/0253810 A1 | 10/2012 | Sutton et al. |
| 2012/0278694 A1 | 11/2012 | Washio |
| 2012/0311703 A1 | 12/2012 | Yanovsky et al. |
| 2013/0036455 A1 | 2/2013 | Bodi et al. |
| 2013/0060905 A1 | 3/2013 | Mickens et al. |
| 2013/0067012 A1 | 3/2013 | Matzkel et al. |
| 2013/0081142 A1 | 3/2013 | Mcdougal et al. |
| 2013/0083129 A1 | 4/2013 | Thompson et al. |
| 2013/0086645 A1 | 4/2013 | Srinivasan et al. |
| 2013/0104198 A1 | 4/2013 | Grim |
| 2013/0128883 A1 | 5/2013 | Lawson et al. |
| 2013/0145425 A1 | 6/2013 | Shen et al. |
| 2013/0173712 A1 | 7/2013 | Monjas Llorente et al. |
| 2013/0185775 A1 | 7/2013 | Dispensa |
| 2013/0247192 A1 | 9/2013 | Krasser et al. |
| 2013/0263226 A1 | 10/2013 | Sudia |
| 2013/0305318 A1 | 11/2013 | Deluca et al. |
| 2013/0318580 A1 | 11/2013 | Gudlavenkatasiva et al. |
| 2013/0339457 A1 | 12/2013 | Freire et al. |
| 2013/0340079 A1 | 12/2013 | Gottlieb et al. |
| 2013/0346528 A1 | 12/2013 | Shinde et al. |
| 2014/0007238 A1 | 1/2014 | Magee et al. |
| 2014/0032589 A1 | 1/2014 | Styler et al. |
| 2014/0082726 A1 | 3/2014 | Dreller et al. |
| 2014/0123279 A1 | 5/2014 | Bishop et al. |
| 2014/0187203 A1 | 7/2014 | Bombacino et al. |
| 2014/0189808 A1 | 7/2014 | Mahaffey et al. |
| 2014/0214895 A1 | 7/2014 | Higgins et al. |
| 2014/0215571 A1 | 7/2014 | Shuster |
| 2014/0230061 A1 | 8/2014 | Higbee et al. |
| 2014/0245396 A1 | 8/2014 | Oberheide et al. |
| 2014/0250506 A1 | 9/2014 | Hallam-Baker |
| 2014/0258420 A1 | 9/2014 | Dent et al. |
| 2014/0259158 A1 | 9/2014 | Brown et al. |
| 2014/0317697 A1 | 10/2014 | Nimashakavi et al. |
| 2014/0340822 A1 | 11/2014 | Lal et al. |
| 2014/0366144 A1 | 12/2014 | Alperovitch et al. |
| 2015/0030156 A1 | 1/2015 | Perez |
| 2015/0033343 A1 | 1/2015 | Jiang et al. |
| 2015/0067833 A1 | 3/2015 | Verma et al. |
| 2015/0081722 A1 | 3/2015 | Terada et al. |
| 2015/0100896 A1 | 4/2015 | Shmarovoz et al. |
| 2015/0113627 A1 | 4/2015 | Curtis et al. |
| 2015/0148006 A1 | 5/2015 | Skudlark et al. |
| 2015/0156154 A1 | 6/2015 | Russell et al. |
| 2015/0172233 A1 | 6/2015 | She |
| 2015/0216413 A1 | 8/2015 | Soyao et al. |
| 2015/0236990 A1 | 8/2015 | Shan et al. |
| 2015/0288714 A1 | 10/2015 | Emigh et al. |
| 2015/0326510 A1 | 11/2015 | Tomlinson et al. |
| 2015/0334065 A1 | 11/2015 | Yan et al. |
| 2015/0363839 A1 | 12/2015 | Zolty |

(56) References Cited

U.S. PATENT DOCUMENTS

| | | | |
|---|---|---|---|
| 2015/0371212 | A1 | 12/2015 | Giordano et al. |
| 2015/0381533 | A1* | 12/2015 | Klemm ................. H04L 51/02 709/206 |
| 2015/0381653 | A1 | 12/2015 | Starink et al. |
| 2016/0012222 | A1 | 1/2016 | Stolfo et al. |
| 2016/0014151 | A1 | 1/2016 | Prakash |
| 2016/0037270 | A1 | 2/2016 | Polinske et al. |
| 2016/0087925 | A1 | 3/2016 | Kalavagattu et al. |
| 2016/0094566 | A1 | 3/2016 | Parekh |
| 2016/0104132 | A1 | 4/2016 | Abbatiello et al. |
| 2016/0210662 | A1 | 7/2016 | Duggal et al. |
| 2016/0225897 | A1 | 8/2016 | Sridhar |
| 2016/0253481 | A1 | 9/2016 | Tian et al. |
| 2016/0255049 | A1 | 9/2016 | Windsor et al. |
| 2016/0269437 | A1 | 9/2016 | Mcdougal et al. |
| 2016/0277485 | A1 | 9/2016 | Abrams et al. |
| 2016/0301705 | A1 | 10/2016 | Higbee et al. |
| 2016/0301709 | A1 | 10/2016 | Hassanzadeh et al. |
| 2016/0352840 | A1 | 12/2016 | Negron et al. |
| 2016/0359790 | A1 | 12/2016 | Zhang et al. |
| 2017/0005961 | A1 | 1/2017 | Liebmann et al. |
| 2017/0078321 | A1 | 3/2017 | Maylor et al. |
| 2017/0085584 | A1 | 3/2017 | Goutal |
| 2017/0091274 | A1 | 3/2017 | Guo et al. |
| 2017/0126661 | A1 | 5/2017 | Brannon |
| 2017/0134423 | A1 | 5/2017 | Sysman et al. |
| 2017/0195310 | A1 | 7/2017 | Tyler et al. |
| 2017/0206545 | A1 | 7/2017 | Gupta et al. |
| 2017/0223034 | A1 | 8/2017 | Singh et al. |
| 2017/0230323 | A1 | 8/2017 | Jakobsson |
| 2017/0230403 | A1 | 8/2017 | Kennedy et al. |
| 2017/0251006 | A1 | 8/2017 | Larosa et al. |
| 2017/0324767 | A1 | 11/2017 | Srivastava |
| 2017/0331816 | A1 | 11/2017 | Votaw et al. |
| 2017/0331824 | A1 | 11/2017 | Pender et al. |
| 2018/0041491 | A1 | 2/2018 | Gupta et al. |
| 2018/0041515 | A1 | 2/2018 | Gupta et al. |
| 2018/0091453 | A1* | 3/2018 | Jakobsson ........... H04L 63/1441 |
| 2018/0091476 | A1* | 3/2018 | Jakobsson ........... H04L 63/1433 |
| 2018/0097841 | A1 | 4/2018 | Stolarz et al. |
| 2018/0131686 | A1 | 5/2018 | Brannon |
| 2018/0152471 | A1* | 5/2018 | Jakobsson ........... H04L 63/1425 |
| 2018/0159808 | A1* | 6/2018 | Pal ........................ H04L 51/212 |
| 2018/0160387 | A1 | 6/2018 | Chastain et al. |
| 2018/0184289 | A1 | 6/2018 | Dudley |
| 2018/0343246 | A1 | 11/2018 | Benayed |
| 2019/0012478 | A1 | 1/2019 | Narayanaswamy et al. |
| 2019/0095498 | A1 | 3/2019 | Srinivasan et al. |
| 2019/0095516 | A1 | 3/2019 | Srinivasan et al. |
| 2019/0179493 | A1* | 6/2019 | Goenka ................. G06F 3/0482 |
| 2019/0213498 | A1* | 7/2019 | Adjaoute ............... G06N 3/126 |
| 2019/0306237 | A1 | 10/2019 | Srinivasan et al. |
| 2020/0067861 | A1* | 2/2020 | Leddy .................. G06F 21/6245 |
| 2020/0067978 | A1 | 2/2020 | Jakobsson |
| 2020/0076817 | A1 | 3/2020 | Gupta et al. |
| 2020/0244638 | A1 | 7/2020 | Gupta et al. |
| 2020/0264860 | A1 | 8/2020 | Srinivasan et al. |
| 2020/0265062 | A1 | 8/2020 | Srinivasan et al. |

OTHER PUBLICATIONS

Peterson et al. "Authenticated Identity Management in the Session Initiation Protocol (SIP)". Jul. 15, 2013. https://www.ietf.org/archive/id/draft-jennings-dispatch-rfc4474bis-01.txt.

Peterson et al. "Authenticated Identity Management in the Session Initiation Protocol (SIP)". May 29, 2013. https://datatracker.ietf.org/doc/draft-jennings-dispatch-rfc4474bis/00/.

Robinson et al., Caching Context Information in Persvasive System, MDS '06: Proceedings of the 3rd International Middleware doctoral Symposium. Nov. 2006, pp. 1 (Year: 2006).

Ronald L. Rivest, "RSF Quickstart Guide", Sep. 1, 2004.

RSA 7035_CONPRO_SB_0711 "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.

RSA 9697_AATF_SB_0808 "RSA Adaptive Authentication overview solution brief"; https://web.archive.org/web/20101225124323/http://www.rsa.com/products/consumer/sb/9697_AATF_SB_0808.pdf. Dec. 25, 2010.

RSA AAAM_SB_0208 "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.

Search Query Report from IP.com (performed Jan. 6, 2020) (Year: 2020).

Search Query Report from IP.com (performed Apr. 8, 2021) (Year: 2021).

Search Query Report from IP.com (performed Jul. 31, 2020) (Year: 2020).

Toopher: https://web.archive.org/web/20120430105502/http://toopher.com/. Apr. 30, 2012.

Toopher: Toopher Developer Documentation; https://web.archive.org/web/20120523192419/https://www.toopher.com/developers.html. May 23, 2012.

Tyagi et al., "Traceback for End-to-End Encrypted Messaging" CCS '19: Proceeding of 2019 ACM SIGSAC Conference on Computer and Communications Security. pp. 4134-430 (Year: 2019).

R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.

S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.

Author Unknown, Petmail Design, Downloaded From "https://web.archive.org/web/20150905235136if_/http:/petmail.lothar.com/design.html", Jul. 2005.

Author Unknown, postshield.net, Challenge and Response, Downloaded From "https://web.archive.org/web/20080117111334/http://www.postshield.net:80/ChallengeAndResponse.aspx", Jan. 17, 2008.

Author Unknown, Product Information, "Sender Validation is the solution to your company's spam problem.", downloaded from "https://web.archive.org/web/20140413143328/http:/www.spamlion.com:80/Products.asp", Apr. 13, 2014.

Author Unknown, Say Goodbye to Email Overload, Downloaded From "https://web.archive.org/web/20160119092844/http://www.boxbe.com:80/how-it-works", Jan. 19, 2016.

Author Unknown, Sendio, "Inbox Security. Threats eliminated with a layered technology approach.", downloaded from "https://web.archive.org/web/20140213192151/http:/www.sendio.com/solutions/security/", Feb. 13, 2014.

Author Unknown, Spam Pepper, Combatting Net Spam, Downloaded From "https://web.archive.org/web/20141002210345/http://www.spampepper.com:80/spampepper-com/", Oct. 2, 2014.

Author Unknown, Spam Snag, Stop Unsolicited Emails Forever!, Downloaded From "https://web.archive.org/web/20081220202500/http://www.spamsnag.com:80/how.php", Dec. 20, 2008.

Author Unknown, Spam: Overview, Downloaded From "https://web.archive.org/web/20090107024207/http:/www.spamwall.net/products.htm", Jan. 7, 2009.

Author Unknown, Spamblocks is a Web Based Mail Filtering Service Which Integrates With Your Existing Mailbox., Downloaded From "https://web.archive.org/web/20090107050428/http:/www.spamblocks.net/howitworks/detailed_system_overview.php", Jan. 7, 2009.

Author Unknown, spamcerbere.com, Downloaded From "https://web.archive.org/web/20070629011221/http:/www.spamcerbere.com:80/en/howitworks.php", Jun. 29, 2007.

Author Unknown, Spamjadoo: Ultimate Spam Protection, Downloaded From "https://web.archive.org/web/20140512000636/http:/www.spamjadoo.com:80/esp-explained.htm" May 12, 2014.

Author Unknown, Spamkilling, "What is AntiSpam?", downloaded from "https://web.archive.org/web/20100411141933/http:/www.spamkilling.com:80/home_html.htm", Apr. 11, 2010.

(56) References Cited

OTHER PUBLICATIONS

Author Unknown, spamrestraint.com: How Does It Work?, Downloaded From "https://web.archive.org/web/20050206071926/http://www.spamrestraint.com:80/moreinfo.html", Feb. 6, 2005.

Author Unknown, Tagged Message Delivery Agent (TMDA), Downloaded From "http://web.archive.org/web/20160122072207/http://www.tmda.net/", Jan. 22, 2016.

Author Unknown, Usebestmail Provides a Mechanism for Validating Mail From Non-Usebestmail Correspondents., Downloaded From "https://web.archive.org/web/20090106142235/http://www.usebestmail.com/UseBestMail/Challenge_Response.html", Jan. 6, 2009.

Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.

Author Unknown, V@Nquishlabs, How It Works: Features, Downloaded From "https://web.archive.org/web/20081015072416/http://vanquish.com/features/features_how_it_works.shtml", Oct. 15, 2008.

Author Unknown, What is Auto Spam Killer, Downloaded From "https://web.archive.org./web/20090215025157/http://knockmail.com:80/support/descriptionask.html", Feb. 15, 2009.

Author Unknown, White List Email (WLE), Downloaded From "https://web.archive.org/web/20150912154811/http:/www.rfc1149.net/devel/wle.html", Sep. 12, 2015.

Binkley et al., "Improving identifier informativeness using part of speech information", MSR '11: Proceedings of the 8th Working Conference on Mining Software Repositories. May 2011, pp. 203-206. (Year: 2011.

Brad Templeton, "Proper principles for Challenge/Response anti-spam systems", downloaded from "http://web.archive.org/web/2015090608593/http://www.templetons.com/brad/spam/challengeresponse.html", Sep. 6, 2015.

Danny Sleator, "Blowback: A Spam Blocking System", downlaoded from "https://web.archive.org/web/20150910031444/http://www.cs.cmu.edu/~sleator/blowback", Sep. 10, 2015.

David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.

Entrust "Strong Multifactor Authentication Methods from Entrust IdentityGuard," https://web.archive.org/web/20110825101942/http://www.entrust.com/strong-authentication/authenticators.htm. Aug. 25, 2011.

Entrust: Mobile Authentication and Transaction Verification1,2,3, https://web.archive.org/web/20110814071521/http://www.entrust.com/mobile-security. Aug. 14, 2011.

Entrust: Proven Transaction Verification on Smartphones & Mobile Devices—Entrust,https://web.archive.org/web/20110918231205/http://www.entrust.com/transaction-verification/index.htm. Sep. 18, 2011.

Entrust: WP_Securing_Whats_At_Risk_July08, https://web.archive.org/web/20110809104408/http://download.entrust.com/resources/download.cfm/22313/. Aug. 9, 2011.

Esphinx "Cyota and Quova Reducing Online Fraud with Cyotas eVision Technology," https://web.archive.org/web/20060307092523/http://www.cyota.com/press-releases.asp?id=81. Mar. 7, 2006.

Esphinx "Cyota eSphinx," https://web.archive.org/web/20051214102438/http://www.cyota.com/product_7.asp. Dec. 14, 2020.

Esphinx "Cyota launches new authentication platform for online banking," https://web.archive.org/web/20050508152420/http://www.cyota.com/news.asp?id=173. May 8, 2005.

Esphinx "How Does it Work?"; https://web.archive.org/web/20051210112946/http://www.cyota.com/product_7_19. asp. Dec. 10, 2005.

Esphinx "Key Features," https://web.archive.org/web/20051210114904/http://www.cyota.com/product_7_18.asp. Dec. 10, 2005.

ESphinx: Cyota releases eSphinx online authentication package, https://web.archive.org/web/20050508152435/http://www.cyota.com/news.asp?id=170. May 8, 2005.

Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.

Green Armor: Dec. 8, 2005 Press Release: "Green Armor Solutions Introduces Identity Cues Two Factor"; http://www.greenarmor.com/Green_Armor_Solutions_News-2005-12-07.shtml.

Green Armor: Green Armor Solutions "Identity Cues Products"; https://web.archive.org/web/20060110032814/http:/www.greenarmor.com/products.shtml. Jan. 10, 2006.

Green Armor: Green Armor Solutions "Identity Cues Two Factor & Two Way Authentication"; https://web.archive.org/web/20060209211113/http:/www.greenarmor.com/DataSheets/Identity%20Cues%20Two%20Factor%20Data%20Sheet.pdf. Feb. 9, 2006.

Heinermann et al., "Recommending API methods based on identifier contexts", SUITE '11: Proceedings of the 3rd International Workshop on Search-Driven Development: Users, Infrastructure, Tools, and Evaluation. May 2011, pp. 1-4. (Year: 2011).

James Thornton, "Challenge/Response at the SMTP Level", downloaded from "https://web.archive.org/web/20140215111642/http://original.jamesthornton.com/writing/challenge-response-at-smtp-level.html", Feb. 15, 2014.

Karsten M. Self, "Challenge-Response Anti-Spam Systems Considered Harmful", downloaded from "ftp://linuxmafia.com/faq/Mail/challenge-response.html", last updated Dec. 29, 2003.

Kim et al., Context Information-based application access central model, IMCOM '16: Proceedings of the 10th International Conference on Ubiquitous Information Management and Communication. Jan. 2016, Article No. 75, pp. 1-5 (Year: 2016).

Laszka et al., "Integrity assurance in resource-bounded systems through stochastic message authentication", HotSoS '15: Proceedings of the 2015 Symposium and Bootcamp on the Science of security. Apr. 2015, Article No. 1, pp. 1-12. https://doi.org/ (Year: 2015.

M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.

Marco Paganini, Active Spam Killer, "How It Works", downloaded from "https://web.archive.org/web/20150616133020/http:/a-s-k.sourceforge.net:80/howitworks.html", Jun. 16, 2015.

NIST. Usability of Security. http://csrc.nist.gov/security-usability/HTML/research.html. May 1, 2015.

Park et al., "Scambaiter: Understanding Targeted Nigerian Scams on Craigslist", published in Network and Distributed System Security Symposium (NDSS), 2014.

Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.

Author Unknown, qconfirm—How it works, downloaded from https://web.archive.org/web/20150915060329/http:/smarden.org/qconfirm/technical.html, Sep. 15, 2015.

E. Zwicky, F. Martin, E. Lear, T. Draegen, and K. Andersen. Interoperability Issues Between DMARC and Indirect Email Flows. Internet-Draft draft-ietf-dmarc-interoperability-18, Internet Engineering Task Force, Sep. 2016.

A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.

Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.

(56) References Cited

OTHER PUBLICATIONS

Author Unknown, "Federal Court Denies Attempt By Mailblocks, Inc. To Shut Down Spamarrest LLC", downloaded from "http://www.spamarrest.com/pr/releases/20030611.jsp", Seattle, WA, Jun. 11, 2003.

Author Unknown, "Stop Spam Mail, Block Offensive Materials, Save Time and Money", iPermitMail Email Firewall Version 3.0, 2003.

Author Unknown, Boxsentry, an Advanced Email Validation Facility to Prevent Spam, Downloaded From "https://web.archive.org/web/20040803060108/http://www.boxsentry.com:80/workings.html", Aug. 3, 2004.

Author Unknown, Fairuce: A Spam Filter That Stops Spam by Verifying Sender Identity Instead of Filtering Content., Downloaded From "https://web.archive.org/web/20061017101305/https:/secure.alphaworks.ibm.com/tech/fairuce", posted Nov. 30, 2004, captured on Oct. 17, 2006.

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

Author Unknown, "Junk Mail Buffering Agent", downloaded from http://www.ivarch.com/programs/jmba.shtml, Jun. 2005.

Author Unknown, "SpamFry: Welcome to our Beta testers", downloaded from https://web.archive.org/web/20050404214637/http:www.spamfry.net:80/, Apr. 4, 2005.

Author Unknown, Mailduster, Tour 1: Show Me How Mailduster Blocks Spam, Downloaded From "https://web.archive.org/web/20070609210003/http://www.mailduster.com:80/tour1.phtml", Jun. 9, 2007.

Author Unknown, Mailduster, Tour 2: But How Do My Friends and Colleagues Send Me Email?, Downloaded From "https://web.archive.org/web/20070609210039/http://www.mailduster.com:80/tour2.ohtml", Jun. 9, 2007.

Author Unknown, Mailduster, Tour 3: How Do I Manage This "Allow and Deny List"?, downloaded from "https://web.archive.org/web/20070610012141/http://www.mailduster.com:80/tour3.phtml", Jun. 10, 2007.

Author Unknown, Mailduster, User Guide, Downloaded From "https://web.archive.org/web/20070612091602/http://www.mailduster.com:80/userguide.phtml", Jun. 12, 2007.

Author Unknown, ASB Antispam Official Home Page, Downloaded From "https://web.archive.org/web/20080605074520/http://asbsoft.netwu.com:80/index.html", Jun. 5, 2008.

Author Unknown, Kens Spam Filter 1.40, Downloaded From "https://web.archive.org/web/20080317184558/http://www.kensmail.net:80/spam.html", Mar. 17, 2008.

Author Unknown, "Frequently asked questions regarding Spamboomerang: Test Drive how Spam Boomerang treats unknown senders", downloaded from "https://web.archive.org/web/20080719034305/http:/www.triveni.com.au/ Spamboomerang/Spam_Faq.html", Jul. 19, 2008.

Akin et al., "Efficient hardware implementations of high throughput SHA-3 candidates keccak, luffa and blue midnight wish for single- and multi-message hashing", SIN '10: Proceedings of the 3rd international conference on security of information and network. pp. 168-177 (Year: 2010).

Author Unknown, How Mail Unknown Works., Downloaded From "https://web.archive.org/web/20100123200126/http://www.mailunknown.com:80/HowMailUnknownWorks.asp#VerifyValidate", Jan. 23, 2010.

Author Unknown, "Babastik: AntiSpam Personal", downloaded from "https://web.archive.org/web/20101031061734/babastik.com/AntiSpam-Personal/", Oct. 31, 2010.

Author Unknown, "No Software to Install", downloaded from "https://web.archive.org/web/201002095356/http://www.cleanmymailbox.com:80/howitworks.html", Oct. 2, 2010.

Author Unknown, Home: about.com, Downloaded From "https://web.archive.org/web/20110201205543/quarantinemail.com/" Feb. 1, 2011.

Author Unknown, "First of all, Your Software is Excellent", downloaded from "https://web.archive.org/web/20120182074130/http://www.spamresearchcenter.com/", Aug. 12, 2012.

Author Unknown, mailcircuit.com, Secure: Spam Protection, Downloaded From "https://web.archive.org/web/20131109042243/http:/www.mailcircuit.com/secure/", Nov. 9, 2013.

Author Unknown, (Steven)—Artificial Intelligence for Your Email, Downloaded From "https://web.archive.org/web/20140607193205/http://www.softwaredevelopment.net.au:80/pge_steven.htm", Jun. 7, 2014.

Author Unknown, "bluebottle—trusted delivery", downloaded from "https://web.archive.org/web/20140715223712/https://bluebottle.com/trusted-delivery.php", Jul. 15, 2014.

Author Unknown, 0spam.com, Frequently Asked Questions, Downloaded From "https://web.archive.org/web/20150428181716/http://www.0spam.com:80/support.shtml#/whatisit", Apr. 28, 2015.

Author Unknown, Alan Clifford's Software Page, Downloaded From "https://web.archive.org/web/20150813112933/http:/clifford.ac/software.html", Aug. 13, 2015.

Author Unknown, cashramspam.com, "Learn More about CRS: Welcome to CashRamSpam", downloaded from "https://web.archive.org/web/20151014175603/http:/cashramspam.com/learnmore/index.phtml", Oct. 14, 2015.

Author Unknown, DRCC NSJ, New Features: Query/Response System and Bayesian Auto-Leaning, Downloaded From "https://web.archive.org/web/20150520052601/http:/domino-240.drcc.com:80/publicaccess/news.nsf/preview/DCRR-69PKU5", May 20, 2015.

Author Unknown, Affini: A Network of Trust, downloaded from https://web.archive.org/web/20100212113200/http://www.affini.com:80/main/info.html, Feb. 12, 2010.

Author Unknown, Joe Maimon—Sendmail Page, Downloaded From "https://web.archive.org/web/20150820074626/http:/www.jmaimon.com/sendmail/" Aug. 20, 2015.

Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.

Author Unknown, Captcha: Telling Humans and Computers Apart Automatically, Downloaded From "https://web.archive.org/web/20160124075223/http:/www.captcha.net/", Jan. 24, 2016.

Author Unknown, How Choicemail Works, Downloaded From "https://web.archive.org/web/20160111013759/http://www.digiportal.com:80/products/how-choicemail-works.html", Jan. 11, 2016.

Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.

Author Unknown, Permitmail, Products: the Most Advanced Email Firewall Available for Your Business, downloaded from "https://web.archive.org/web/20160219151855/http://ipermitmail.com/ products/", Feb. 19, 2016.

Author Unknown, "Rejecting spam with a procmail accept list", downloaded from "https://web.archive.org/web/20160320083258/http:/angel.net/~nic/spam-x/", Mar. 20, 2016.

Adrian E. McElligott, "A Security pass for messages: message keys", CEAS '11: Proceedings of the 8th Annual Collaboration, Electronic messaging, Anti-abuse and Spam Conference. pp. 184-192 (Year: 2011).

Author Unknown, Boxbe, Wikipedia, Nov. 10, 2016, https://en.wikipedia.org/wiki/Boxbe?wprov=sfsi1.

\* cited by examiner

MESSAGE CAMPAIGN AND MALICIOUS THREAT DETECTION

CROSS REFERENCE TO OTHER APPLICATIONS

This application claims priority to U.S. Provisional Patent Application No. 62/826,569 entitled MALICIOUS EMAIL CAMPAIGN SIGNATURE AND THREAT DETECTION filed Mar. 29, 2019 which is incorporated herein by reference for all purposes.

BACKGROUND OF THE INVENTION

Email-based attacks are generally sent as one or more distinct email messages sent to one or more distinct recipients. Such attacks are often sent in a coordinated manner, over a period of time, by an individual criminal or criminal organization. The individual email messages that represent an attack campaign often bear some similarity, with multiple messages in the campaign sharing message attributes or characteristics. These coordinated attack campaigns may represent basic spam or may be malicious in intent (e.g., social engineering, malware-based or URL-based phishing attacks, etc.). However, the term "campaign" is also associated with coordinated email-sending behavior for marketing or customer service reasons by legitimate businesses.

BRIEF DESCRIPTION OF THE DRAWINGS

Various embodiments of the invention are disclosed in the following detailed description and the accompanying drawings.

DETAILED DESCRIPTION

Figure 1:
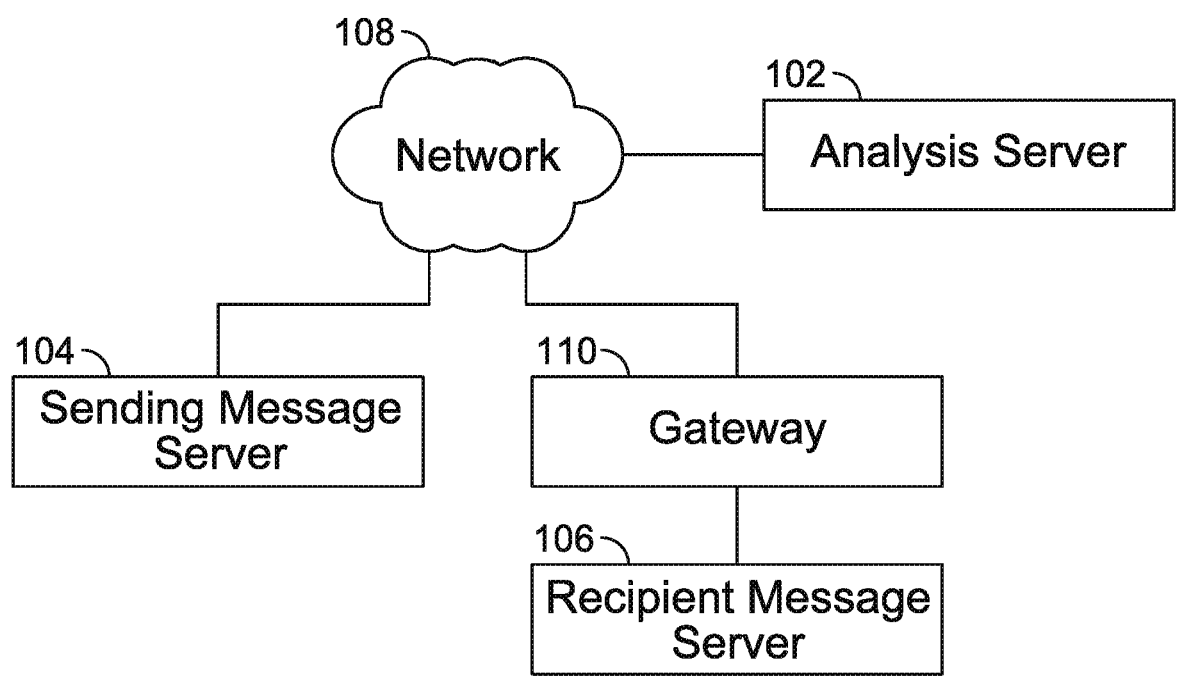
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Senders of malicious messages often attempt to introduce differences between individual messages in a campaign to evade detection by email security systems. For example, a security system attributes a reputation score to a sender server based on its prior message-sending behavior, blocking messages from servers that have previously exhibited malicious or nuisance behavior. In another example, a security system attempts to identify a specific known threat pattern in the URL-based links included in the message. To avoid messages of a campaign from being blocked based on known threat signatures or spam filters, criminals may vary the attributes of messages (e.g., by sending a campaign from a multitude of different servers with varying reputations or by substantially varying the pattern of the URL-based links) or even drastically vary content of messages in the campaign.

If a message security system can identify all or the majority of messages that are part of a campaign, despite the variations introduced by an attacker, it can more effectively block attacks from reaching their intended targets. For example, if a security system identifies a single or small group of messages as definitively malicious, based on a known threat signature or a behavioral detection method, it can block the entire campaign that contains the definitively malicious messages, even if the other messages in the campaign are not detected to be malicious based on known signatures, patterns, or models. In this way, effective campaign identification can help reduce the False Negatives (e.g., attack messages that are not identified as malicious and get delivered) of a security system.

These coordinated attack campaigns may represent spam or may be malicious in intent (e.g., social engineering, malware-based or URL-based phishing attacks, etc.). However, some message campaigns are also associated with coordinated email-sending behavior for marketing or customer service reasons by legitimate businesses. In fact, identification of these legitimate campaigns can also be used to reduce the false positives (e.g., legitimate messages that are incorrectly identified as malicious) of an email security. For example, if an email security system identifies one or a small number of messages as possibly malicious, but the vast majority of messages that are part of the same email campaign as definitively legitimate, then the messages identified as malicious could be re-classified as legitimate and delivered.

In some embodiments, a message is received. For example, the message is received at an email server for analysis prior to delivery to an intended recipient of the message. In alternative embodiments, the received message is a message that has been already received by a recipient and reported as likely malicious by the recipient. It is determined whether the message is a part of a group of related messages. For example, it is determined whether the received message is likely a part of a message campaign of related or similar messages and/or whether other previously received messages are included in a group of related/similar messages that includes the received message. Based on the determination, a security action is performed for one or more messages of the group of related messages. For example, the received message or another message included in the group of related messages is deleted, quarantined, and/or identified for further review. In some embodiments, the group of related messages is identified as malicious based at least in part on identified behavior determined based on a plurality of messages of the group of related messages. For example, rather than merely analyzing content of the messages to identify whether the group of messages is a malicious message campaign, the behavior associated with multiple messages of the group (e.g., message send rate, machine or location utilized to send the messages, aggregate behavior, etc.) is utilized to determine whether the group of messages is malicious.

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is a server that handled sending of a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and analyzes it for potentially harmful or undesired messages. For example, incoming messages are filtered and/or analyzed for malicious messages (e.g., message that includes spam, viruses, spoofing, phishing, impersonation, ATOed (Attack Take Over-ed) sender, and/or any other harmful or undesired content) to detect, prevent, or minimize effects of such messages to a message recipient served by the recipient message server. In some embodiments, analysis server 102 identifies one or more messages as belonging to a group of related messages (e.g., messages of a campaign) and a threat determination made about one of the messages or the group can be attributed to all of the messages of the group to take appropriate security action for the messages.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message in the event a potential threat is detected. In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
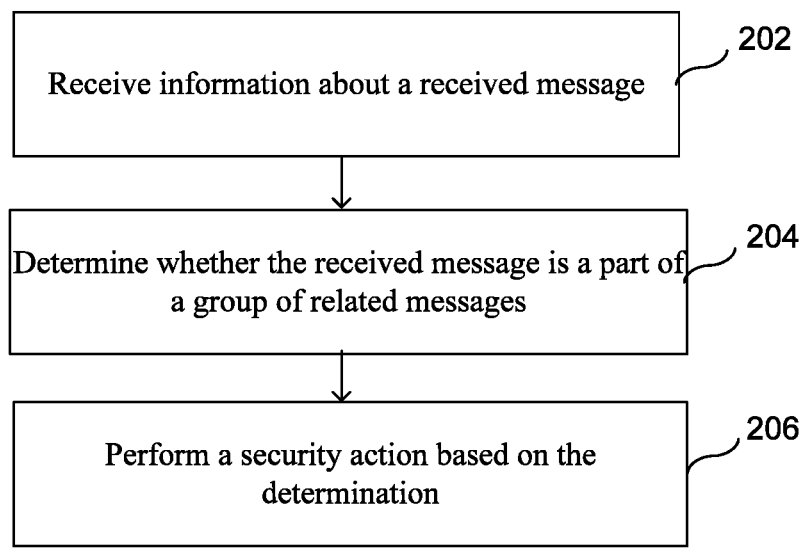
FIG. 2 is a flowchart illustrating an embodiment of a process for determining whether a message is a part of a group of related messages.

FIG. 2 is a flowchart illustrating an embodiment of a process for determining whether a message is a part of a group of related messages. At least a portion of the process of FIG. 2 may be at least in part implemented on analysis server 102 of FIG. 1, gateway 110 of FIG. 1, recipient message server 106 of FIG. 1, and/or any other server.

At 202, information about a received message is received. In some embodiments, the information is received at analysis server 102 of FIG. 1. The received information may include information included in or related to a message received at a message server (e.g., server 106). For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages.

In some embodiments, the received message is a message to be delivered to an intended recipient. For example, the message is received at a recipient email server and the message is to be analyzed for cyber security threats prior to allowing or not allowing the message to be delivered to an intended recipient of the message. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

In some embodiments, the received message is a message from a message repository. For example, the received message is to be analyzed after it has been already delivered to a device of an intended recipient of the message and stored in the repository. In some embodiments, the received message is a message that has been identified as being associated with a high cybersecurity risk. For example, a user, an administrator, and/or an automatic analysis has identified/indicated the received message as malicious (e.g., as being a message that includes spam, virus, spoofing, phishing, impersonation, ATOed sender, and/or any other harmful or undesired content) or otherwise of interest and the received message is to be analyzed to identify other messages that related to the received message (e.g., to identify other similar malicious messages).

At 204, it is determined whether the received message is a part of a group of related messages. For example, it is determined whether the received message is a part of a message campaign. In some embodiments, the determination that the received message is a part of a group of related messages is made prior to a final determination of whether the received message is a malicious message. For example, message campaigns can be benign (e.g., marketing or customer service notices) and analysis of the group of messages together as a group after identification of the group can aid in the cybersecurity threat determination. Identification of a type of campaign (e.g., malicious, phishing attack, marketing, business announcement, etc.) of the group of messages can be used to reduce the false positives (e.g., legitimate messages that are incorrectly identified as malicious) in the identification of a message as malicious. For example, if an email security system identifies one or a small number of messages as possibly malicious, but the vast majority of messages that are part of the same email campaign as definitively legitimate, then the messages identified as malicious could be re-classified as legitimate and delivered.

In an alternative embodiment, a determination of whether the received message is a malicious message is made prior to the determination of whether the received message is a part of a group of related messages. For example, a human and/or automatic analysis/review of the received message has identified the message as malicious, and it is determined whether the received message is a part of a group of related messages to identify other messages that are also likely malicious by being a part of the group. This allows an increase in the marginal risk of messages identified as similar, making more likely identification of associated messages that otherwise may be missed.

In some embodiments, the determining whether the received message is a part of a group of related messages includes comparing one or more various aspects of the received message with corresponding aspects of previously received messages. The aspects of the previously received messages may be stored in a database or other data structure and a comparison analysis is performed using this database to identify the messages with sufficiently similar or same characteristics. Examples of these aspects of the received message include sender name, sender domain, sender address, sender IP address, sending server, subject contents, message contents, etc. It is determined that a received message is a part of a group of related messages if there are other previous messages with a sufficient amount of same or similar aspects.

In some embodiments, a single or small group of similar messages is known by a security system to be definitively malicious. This message or messages can be used as a "seed" to detect other messages that are part of the same campaign. These seeds can be the starting point for the exploration of a search space of messages that have already been received or are in the process of being received, searching for messages that are part of the same campaign. In some embodiments, a set of logical predicates (e.g., boolean-valued functions or conditions) is built based on similarity to the seed messages. These predicates reflect commonly-seen similarity conditions, for example, all messages that share the message subject and display name associated with the seed message. Multiple logical predicates can be built based on known similarity conditions associated with campaigns. The similarity conditions include, but are not limited to, exact matches, substring matches, regular expression matches, or distance function thresholds. The goal of the search is to identify as many messages as possible that are part of the same campaign of the seed messages, without incorrectly including messages that are not part of the same campaign. In some embodiments, these predicates are filtered or modified to eliminate those that will identify too broad a set of possible campaign messages. For example, if a display name or subject line is very short, any logical predicates that include similarity conditions on the display name or subject line are filtered out, since these short strings are not specific enough to yield a good match. As another example, if the domain of the "From" email address of the seed messages is a relatively uncommon source of messages, the system may include a logical predicate that requires an exact match of the "From" domain of the seed messages (e.g., the candidate message has a "From" domain equal to "raredomain.com"). However, if the domain of the "From" email address of the seed message is a very common source of messages (for example, a webmail provider such as gmail.com or yahoo.com), then the system may modify the aforementioned predicate to require a match of the entire From email address of the seed messages, not just the "From" domain (e.g., the candidate has a "From" email address equal to "malicious_sender@gmail.com").

In some embodiments, the determining whether the received message is a part of a group of related messages includes performing a machine learning clustering. For example, a database or other data structure of aspects of previously received messages including the aspects of the received message of 202 and/or stored copies of the messages is analyzed using machine learning clustering to identify cluster groups. If the received message of interest belongs to a cluster group that includes other messages, it is determined that the received message is a part of a group of related messages.

In some embodiments, rather than performing complex analysis of content similarity against previously received messages that would consume a large amount of computational resources, it is determined whether the received message belongs to a cluster group of other messages by evaluating a message send rate associated with a sender of the received message. For example, a message send rate to different recipients over a recent period of time is tracked for each sender domain, sender server, sender IP address, and/or sender address, and if the message send rate exceeds a threshold value, it is determined that all messages sent over the recent period of time are identified as belonging to a same group. The threshold value may be different for different sender domains based on previous message history associated with the sender domain. For example, the threshold value may be based at least in part on previously observed average message send rate for the sender domain, and a new domain without established history would have a lower threshold as compared with a known domain with previously observed high message send rate. In some embodiments, in addition to or instead of the message send rate, subject text of messages is tracked and sufficient similarity between content of the subject text is utilized in the identification of a group of related messages. For example, if the message send rate exceeds the threshold value, it is determined that all messages sent over the recent period of time with sufficient similar subjects (e.g., measure of similarity is above a similarity threshold) are identified as belonging to a same group.

In some embodiments, the determining whether the received message is a part of a group of related messages includes using one or more message group signatures. For example, a signature has been determined for each previously identified message group and aspects of the received message are compared against the signatures to determine whether it matches any of the signatures (e.g., signature match/similarity value is greater than a threshold value). If aspects of the received message match a previously determined signature, it is determined that the received message is a part of the group of related messages corresponding to the matched signature.

At 206, a security action is performed based on the determination. For example, an appropriate security action is performed for one or more messages of the group of related messages identified as malicious.

It may not always be possible for a security system to know a priori whether a message campaign is malicious or legitimate. In some embodiments, the security system can perform campaign threat detection as it incrementally receives messages for the group of messages for the campaign. The determination of security risk (e.g., malicious or legitimate verdicts) for the group of messages may be based on determined security risks for individual messages within the group of messages of the campaign (e.g., using signature-based or behavioral approaches for single messages).

The senders of a message campaign may attempt to introduce differences between individual messages in the campaign to evade detection. In some embodiments, blacklists, reputation databases, and/or machine learning models based on known or pre-existing attacker behavior are utilized. For example, a reputation score is attributed to a sender server based on its prior email-sending behavior, and messages from servers that have previously exhibited malicious or nuisance behavior are blocked. In some embodiments, a specific known threat pattern in a header or messaged contents (e.g., a URL-based link), etc. included in the message triggers determination that the message and/or its group of related messages is malicious.

In some embodiments, the security risk determination may be based on identified behavioral characteristics associated with the group of related messages. For example, rather than merely analyzing content of the messages to identify whether the group of messages is a malicious message campaign, the behavior associated with multiple messages of the group (e.g., message send rate, machine or location utilized to send the messages, aggregate behavior, etc.) is utilized to determine whether the group of messages is malicious. In an example, a message send rate over a recent period of time is tracked for each sender domain, sender server, sender IP address, and/or sender address, and if the message send rate for the group of related messages exceeds a threshold rate, it is determined that the group of related messages is malicious. The threshold value may be different for different sender domains based on previous message history associated with the sender domain. For example, the threshold value may be based at least in part on previously observed average message send rate for the sender domain, and a new domain without established history or not previously observed would have a lower threshold as compared with a known domain with previously observed high message send rate. However, in some cases, if the message send rate is above a secondary en-masse threshold, it is determined that the group of related messages is not malicious. For example, new domains established by corporations for marketing purposes are common and they will reach a lot of people across organizations in a short period of time by typically sending out messages en-masse, all arriving within a minute of each other. This is in contrast with a malicious sender that sets up a new domain and sends a handful of messages, each arriving to their recipients in longer intervals, indicative of script-based behavior. Thus a message send rate above a first threshold but below a second threshold may be indicative of a malicious behavioral characteristic.

In some embodiments, rather than merely utilizing behavioral characteristics to determine message group security risk, other behavior attributes and/or message attributes are utilized instead or in addition to determining the security risk. For example, a message sending profile with various behavioral and/or message attributes is tracked for each sender domain, sender server, sender IP address, and/or sender address. The profile may track a rate of messages sent to new organizations/domains, different display names utilized, reply to addresses, times of day at which messages are sent to a new organization/domain, topics of message subject lines, the geographical location from which messages are sent, attributes of a machine utilized to send messages, sender IP addresses, message metadata, message content signatures, etc. In some embodiments, a detected deviation from a previously observed baseline results in a determination that the received message and/or its group of related messages is malicious (e.g., detects behavioral change).

In an example, if a certain sender sends a message to a new organization/domain that the sender has never contacted but the behavior profile indicates that the sender frequently contacts new organizations/domains, the first message from this sender is not identified as malicious. However, if it is detected that this sender sent a group of related messages to many different new organizations/domains within a short period of time beyond a triggering threshold above a historically observed rate at which the sender has sent messages to new organizations/domains, the group of messages is identified malicious.

In another example, detected differences in tracked display names of the same sender email address for the group of related messages are utilized in making the security risk determination. In another example, when senders that are determined to be likely unrelated to one another (e.g., belong to different organizations, doesn't message one another, etc.) that typically utilize different "reply-to" addresses are detected to utilize a common "reply-to" address that none has utilized before in sent messages, the messages and the group of related messages that these messages belong to are identified as malicious.

In some embodiments, performing the security action includes performing an action with respect to the received message and/or one or more other messages belonging to the associated group of related messages. Examples of the security action include blocking the message, quarantining the message, deleting the message, routing the message for further analysis/review, and/or modifying the message (e.g., insert warning, remove harmful content, etc.).

In some embodiments, performing the security action includes modifying a display name of a sender of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name 'Pat Peterson.'" Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name. In some embodiments, in addition to or instead of the display name, an email address of the sender is also modified. For example, the entire "From:" field of a header of the message that includes both the display name and an email address is modified with a warning.

In some embodiments, performing the security action includes modifying a reply address of a sender of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email. In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause some message clients to bounce the email.

Figure 3:
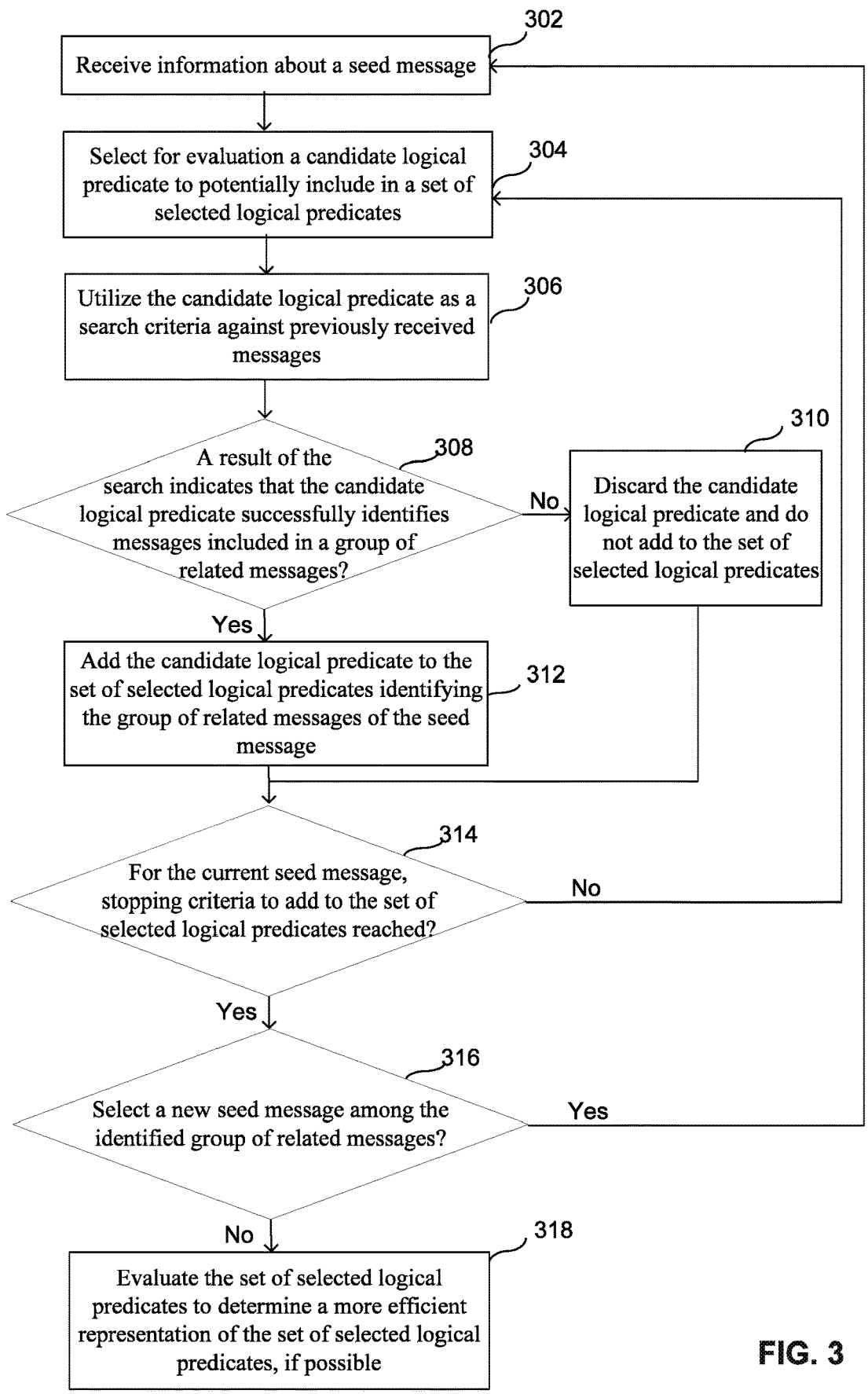
FIG. 3 is a flowchart illustrating an embodiment of a process for determining a set of logical predicates for a group of related messages.

FIG. 3 is a flowchart illustrating an embodiment of a process for determining a set of logical predicates for a group of related messages. At least a portion of the process of FIG. 3 may be at least in part implemented on analysis server 102 of FIG. 1, gateway 110 of FIG. 1, recipient message server 106 of FIG. 1, and/or any other server. In some embodiments, the process of FIG. 3 is at least in part performed in one or more steps of FIG. 2.

At 302, information about a seed message is received. The received information may include information included in or related to the message. For example, the information includes header, metadata, and/or content information. In some embodiments, a single or small group of similar messages are known by a security system to be definitively malicious. For example, a user, an administrator, and/or a security system has reviewed a message and has concluded that the message is malicious. The system uses this message or messages as a "seed" to detect other messages that are part of the same campaign. These seeds are the starting point for the exploration of a search space of messages that have already been received or are in the process of being received, searching for messages that are part of the same campaign. Once other related messages that belong to the campaign group are identified, the same security risk assessment of the seed message can be also attributed to the other messages of the group of related message to trigger appropriate security actions. In some embodiments, in a subsequent iteration, the seed message is a message identified as belonging to a same group of related messages (e.g., same message campaign) as a previous seed message.

At 304, a candidate logical predicate to potentially include in a set of selected logical predicates is selected for evaluation. The set of logical predicates (e.g., Boolean-valued functions or conditions) is built based on similarity to the seed messages. These predicates may reflect commonly-seen similarity conditions, for example, all messages that share the subject AND display the name associated with the seed messages. Multiple logical predicates can be built based on known similarity conditions associated with campaigns. The similarity conditions include, but are not limited to, exact matches, substring matches, regular expression matches, or distance function thresholds. The logical predicates are to identify as many messages as possible that are in the group of related messages (e.g., part of the same campaign) of the seed message(s), without incorrectly including messages that are not part of the same group.

There exists many possible logical predicates that can be utilized and one or more of the logical predicates among possible logical predicate options are selected for evaluation. Each logical predicate defines a function or a condition that determines whether a candidate message being evaluated is a part of a group of related messages (e.g., part of the message campaign) of the seed message. For example, a logical predicate identifies an attribute of the candidate message and the seed message to be compared and the evaluation condition of the attribute in determining whether the candidate message and the seed message belong to the same group/campaign of related messages. Examples of message attributes that a logical predicate may specify in its comparison condition include message subject, sender domain, sender address, sender display name, sender IP address, sending server, message header component, message content, URL included in message, message attachment, etc. In some embodiments, the candidate logical predicate is selected among a library of logical predicate options that have been predetermined (e.g., library of logical predicate options is a collection of logical predicates known to have identified related messages in the past) and a different one is selected from this library upon each iteration of 304 for a particular seed message. In some embodiments, a new candidate logical predicate is generated by modifying a previously existing or generated logical predicate.

If "CM" below is the subscript associated with a candidate message and "SM" below is the subscript of the seed message, examples of the set of selected logical predicates that ultimately gets determined include:

(Subject$_{CM}$ matches regular expression built from Subjects by eliminating all (Re:/Fwd:/[EXT]) prefixes and wildcarding numerical sequences) AND (((FromDomain$_{SM}$ is not that of a webmail provider) AND (FromDomain$_{CM}$ equals FromDomain$_{SM}$)) OR (FromAddress$_{CM}$=FromAddress$_{SM}$))

(FromDisplayName$_{CM}$ equals FromDisplayName$_{SM}$) AND ((intersection of NormalizedURLs of CM and SM>=2) OR (AttachmentsNames$_{CM}$ match regular expressions built from AttachmentNames$_{SM}$ by wildcarding numerical sequences))

These logical predicates are provided as examples and by no means are expected to be a comprehensive list of possible similarity conditions.

At 306, the candidate logical predicate is utilized as a search criteria against previously received messages. For example, each candidate message in a database of previously received messages (e.g., previous messages received within a specified period of time) is evaluated to determine whether the candidate message matches/satisfies the match condition of the candidate logical predicate.

At 308 it is determined whether a result of the search indicates that the candidate logical predicate successfully identifies messages included in a group of related messages of the seed message. This determination is based on the number of the previously received messages matching the candidate logical predicate. If none of the previously received messages match the candidate logical predicate, the candidate logical predicate does not successfully identify any other messages included in a group of related messages and the process proceeds to 310.

Additionally, if the candidate logical predicate matches too many previously received messages, the candidate logical predicate is identifying too broad a set of possible campaign messages and likely is not sufficiently descriptive for a certain type of seed message. For example, if a display name or subject line is very short, any logical predicates that include similarity conditions on the display name or subject line should not be included in the set of selected logical predicates, since these short strings are not specific enough to sufficiently describe the set of related messages of a campaign. As another example, if the domain of the "From" email address of the seed messages is a relatively uncommon source of messages, the set of selected logical predicates may include a logical predicate that requires an exact match of the "From" domain of the seed messages (e.g., the candidate message has a "From" domain equal to "raredomain.com"). However, if the domain of the "From" email address of the seed message is a very common source of messages (e.g., a webmail provider such as gmail.com or yahoo.com), then the set of selected logical predicates should not include a logical predicate that requires an exact match of the "From" domain of the seed messages but rather includes a logical predicate that requires a match of the entire From email address of the seed messages, not just the "From" domain (e.g., the candidate has a "From" email address equal to "malicious_sender@gmail.com"). Thus if the number of previously received messages matching the candidate logical predicate is greater than a descriptive match threshold limit, it is determined that the candidate logical predicate does not successfully identify a message included in a group of related messages, and the process proceeds to 310. The descriptive match threshold limit may be a dynamic value based on a total number of previously received messages evaluated against the candidate logical predicate (e.g., a percentage of the total number of previously received messages evaluated) and/or a total number of recipient accounts of the previously received messages evaluated (e.g., a limited scale based on the total number of recipient accounts).

In some embodiments, it is determined that the result of the search indicates that the candidate logical predicate successfully identifies a message included in a group of related messages of the seed message if the number of the previously received messages matching the candidate logical predicate is greater than zero but less than the descriptive match threshold limit, and the process proceeds to 312.

At 310, the candidate logical predicate is discarded and not added to the set of selected logical predicates identifying the group of related messages of the seed message.

At 312, the candidate logical predicate is added to the set of selected logical predicates identifying the group of related messages of the seed message.

At 314, it is determined whether for the current seed message, a stopping criteria to add to the set of selected logical predicates has been reached. In some embodiments, the stopping criteria is reached after a preconfigured number of iterations of 304. For example, in order to limit the amount of time and resources spent on building the set of logical predicates, the number of new candidate logical predicates evaluated for inclusion in the set of selected logical predicates is limited. In some embodiments, the stopping criteria is reached after all of the logical predicates in a set/library of logical predicate options have been selected among the different iterations of 304.

If at 314 it is determined that the stopping criteria to add to the set of selected logical predicates has not been reached, the process returns to 304 where a new candidate logical predicate is selected (e.g., selected from a library of predetermined options or generated by modifying the previous or another previously determined logical predicate).

If at 314 it is determined that the stopping criteria to add to the set of selected logical predicates has been reached, at 316 it is determined whether to select a new seed message among the identified group of related messages. If there are messages among the identified group of related messages that have not been a seed message, the process returns to 302 where a message that was newly identified as part of the group of related messages of the campaign becomes the new seed message. Then the process proceeds further to evaluate where new candidate logical predicates to add to the existing set of selected logical predicates are evaluated for the new seed message. This process may be performed recursively until no new messages are found. This recursive evaluation can be used to find messages that are part of the campaign that share no, or very few, similarities with the initial seed messages. If there are no more messages among the identified group of related messages that have not been a seed message, the process proceeds to 318. In some embodiments, 316 is optional (e.g., process proceeds from 314 to 318).

At 318, the set of selected logical predicates is evaluated to determine a more efficient representation of the set of selected logical predicates, if possible. The set of all logical predicates that were used to explore the search space represents the signature of the group of related messages (e.g., signature of the message campaign). Because this signature can be used in the future to identify other messages in the group of related messages (e.g., utilized in 202 of FIG. 2), the set of all logical predicates is evaluated to determine a more efficient representation to reduce the cost of future evaluation against new candidate messages. Because the set of selected logical predicates may be incremental built by iteratively adding logical predicate portions, the overall representation of the set of selected logical predicates may not be expressed in the most efficient form and a logically equivalent but more efficient/compact representation of the overall representation of the set of selected logical predicates is automatically determined. For example, a set cover algorithm is utilized to find the smallest subset of logical predicates that identifies all of the campaign messages, thereby eliminating any predicates that do not add additional messages. This may result in one or more redundant logical predicate portions being eliminated from the set of selected logical predicates to determine the campaign signature.

In some embodiments, a human being, such as a security analyst, can be involved in the building of the set of selected logical predicates (e.g., campaign signature). At each step described in the process of FIG. 3, the security analyst may filter or modify the logical predicates by evaluating the returned messages to determine whether they are correctly identifying messages that are part of the same campaign as the seed messages or are including messages that are not within the same campaign as the seed messages. The analyst may also determine whether any messages that are detected as part of the campaign are definitively malicious or legitimate, coincidentally participating in campaign threat detection.

In some embodiments, the determined representation of the set of selected logical predicates (e.g., efficient version of the set of selected logical predicates, if possible) and an identification of the messages matching the representation (e.g., identification of one or more messages included in the group of related messages) are provided.

In some embodiments, when the process of FIG. 3 is included in 204 of FIG. 2, at 206 of FIG. 2, a security action is retroactively taken on newly identified previously delivered messages included in the group of related messages based on whether the group/campaign is determined to be malicious. For example, if some messages that were part of the campaign are determined to be definitively malicious, the entire campaign may be given a malicious verdict and all messages identified with the campaign can be deleted or moved from the mailboxes of the recipients. If a message has been read or acted upon by its recipient, additional remediation steps may be necessary. If, on the other hand, some messages that were part of the campaign are determined to be definitively legitimate, the entire campaign may be given a legitimate verdict and any messages of the campaign that were previously quarantined because they were inferred to be malicious can be released from quarantine.

In some embodiments, the campaign signature is utilized to evaluates newly arriving messages for a period of time (e.g., utilized to identify whether the received message is a part of a message campaign in 204 of FIG. 2). If a message matches any of the logical predicates that are part of the signature, it is considered to be part of the campaign. If the campaign is known to be malicious, the message is blocked or quarantined. If the campaign is known to be legitimate, the message can be delivered. In some embodiments, the security system shares campaign signatures with other parties as part of a threat feed.

In some embodiments, every message received by a security system can be considered as a seed for campaign signature detection. A campaign signature is built as a set of logical predicates representing similarity conditions to attributes of the seed message. These logical predicates are stored by the security system and used to evaluate all subsequent messages received for campaign inclusion. If a message matches one of the logical predicates, it is considered to be part of the campaign and the logical predicates for the campaign may be extended to include new predicates based on the new campaign message. The security system maintains multiple active campaign signatures representing different campaigns, associating each received message with zero or more active campaigns. In one embodiment, the logical predicates associated with a campaign signature expire and are no longer used for evaluation if they do not match any messages for a specific period of time or for a specific number of messages received.

Figure 4:
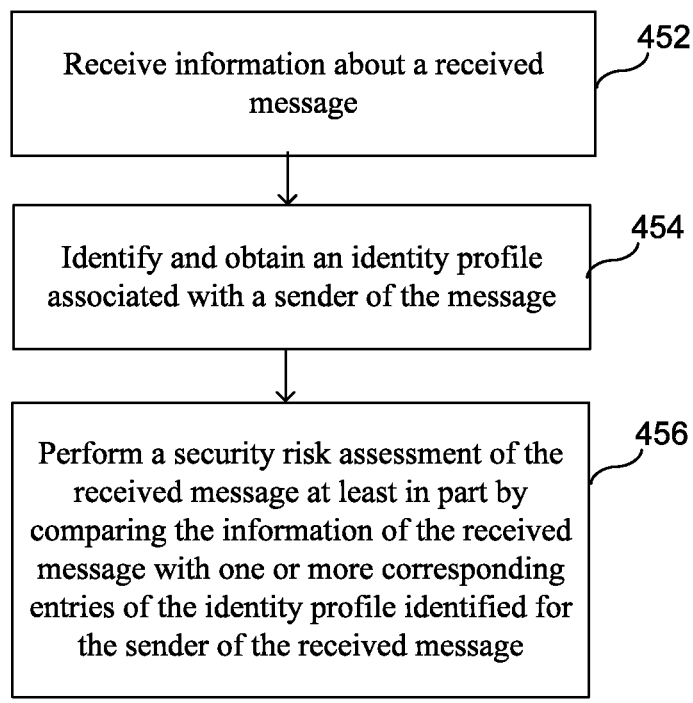
FIG. 4 is a flowchart illustrating an embodiment of a process for analyzing a received message for security risks.

FIG. 4 is a flowchart illustrating an embodiment of a process for analyzing a received message for security risks. For example, the process of FIG. 4 is utilized to detect lookalike, spoofing, or account take-over risks of a sender of an electronic message and take responsive action to mitigate potential effects of the risk. The process of FIG. 4 may be at least in part implemented on analysis server 102, gateway 110, and/or message server 106 of FIG. 1. In some embodiments, at least a portion of the process of FIG. 4 is performed in 206 of FIG. 2. For example, the process of FIG. 4 is utilized to assess a security risk of a message included in the group of related messages. A security risk made about the message may then be attributed to the entire group of related messages for appropriate security action. In some embodiments, the received message in 202 of FIG. 2 and/or the seed message in 302 of FIG. 3 is a message that has been analyzed for security risks using the process of FIG. 4.

At 452, information about a received message (e.g., message to be delivered to an intended recipient) is received. In some embodiments, the information is received at analysis server 102 of FIG. 1. The information may include information included in or related to the message. For example, the information includes email header information including information related to email accounts (e.g., email address, display name, etc.) of the sender, devices used to compose/send the message (e.g., mail user agent, operating system, device time zone, etc.), networks utilized (e.g., server, IP address, cellular network/carrier, etc.), automation, if any, utilized to send the message (e.g., whether a script/API was utilized to send the message), etc. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 454, an identity profile associated with a sender of the message is identified and obtained. In some embodiments, the identity profile associated with the sender is identified by identifying an identity profile associated with a sender display name of the message and/or a sender message address (e.g., sender email address) of the message.

The identity profile stores information about a user that can be used to determine a likelihood that a message purportedly sent by or otherwise associated with the user was actually sent by the user. The information stored in the identity profile may include information associated with one or more of the following: observed/trusted message accounts of the user (e.g., email addresses and display names of various email accounts of the user), observed/trusted devices of the user (e.g., mail user agent, operating system, device time zone, etc.), utilized/trusted networks of the user (e.g., servers, IP addresses, cellular networks/carrier, etc.), automation utilized to send messages by the user (e.g., whether a script/API has been utilized to send the message), message contacts of the user, etc. In some embodiments, information of the identity profile may be at least in part obtained from provided information. For example, an employer, an administrator, and/or the user may have provided information that identifies at least a portion of information stored in the identity profile. In some embodiments, information of the identity profile may be at least in part obtained from observed communications of the user. For example, when a message sent by the user or a message received from the user is observed, desired information is extracted from the header of the message and used to build/update and store the identity profile of the user. Whether a specific account, device identifier, networks, etc. are identified as trusted (e.g., not a security risk) in the identity profile may be based on a specification from an administrator and/or the user or past observations of message traffic associated with the user (e.g., threshold number of messages with the associated property detected for the property to be marked trusted). In some embodiments, a security risk associated with each of one or more information entries is determined based on a specification from an administrator and/or the user or past observations of message traffic associated with the user.

In some embodiments, previously received messages from the sender have been profiled by storing information about and/or included in messages in the identity profile of the sender to track historical observations about the sender. For example, in identifying accounts that might have been ATOed, messages sent by the account are to be analyzed based on past observations about typical messages sent by the sender and the degree to which a newly received message from the sender deviates from what has been typically observed about messages sent by the account of the sender. In some embodiments, the historical information about messages by the sender for a particular recipient may be combined with historical information about messages sent by the sender for other recipients to determine a combined message profile/history of the sender for use in assessing security risk of messages by the sender for recipients without an established communication history with the sender. In some embodiments, profiling the message includes profiling, tracking, and/or storing content and/or header information of the message in a data structure that tracks historical information about messages sent by the sender for a particular recipient. In some embodiments, profiling the message includes profiling, tracking, and/or storing content included in the message in the identity profile that tracks historical information about types of content typically included in messages sent by the sender for a particular recipient. For example, the data structure tracks keywords and/or content topic/type included in messages sent by the sender for a particular message recipient and keywords and/or content topic/type detected in the newly received message are used to update this data structure.

In some embodiments, at least a portion of header information of previously received messages has been stored in the identity profile of the sender. In some embodiments, select information included in the header of the message is tracked and associated with the identity profile of the sender. For example, information in the header of the message that identifies one or more of the following is tracked for the sender of the message: a mail user agent, a time zone, IP address, X-headers, supported character sets, and any desired information of interest in the header. One or more different groupings of data in the identity profile for the sender of the message may be updated using the message. For example, certain header information and/or content of messages of the sender may be correlated with each other and associated groups of header entries and/or content entries of messages of the sender are updated when profiling the message. In one example, different groups of data in the identity profile of the sender are categorized based on different devices used by the sender to send messages to a particular recipient.

The table below shows different header information that is collected to build different groupings of data about messages sent using different devices of the sender.

| Feature | iphone | Mac | browser | iPad | Android phone |
|---|---|---|---|---|---|
| DKIM signature? | yes | yes | no | no | yes |
| Mime version | 1.0 (1.0) | 1.0 (Mac OS X Mail 10.1\ (3251\)) | 1.0 | 1.0 (1.0) | 1.0 |
| Content type | text/plain; charset = us-ascii | text/plain; charset = us-ascii | text/html; charset = UTF-8 | text/plain; charset = us-ascii | text/plain; charset = UTF-8 |
| X-Mailer | iPhone Mail (14B72) | Apple Mail (2.3251) | N/A | iPad Mail (14B100) | N/A |
| Message ID | Type 1 | Type 1 | Type 2 (both formatting and subdomain) | Type 1 | Type 2 (both formatting and subdomain) |
| Cipher | TLS1_2 | TLS1_2 | N/A | TLS1_2 | TLS1_2 |

This table shows that by recording the header entries historically associated with messages from the same sender, a prediction can be made in terms of whether a newly received message and aspects of the message in combination are consistent with the past observations. Each trusted sender that has sent a message to a specific recipient is associated with a record that describes what different header configurations have been observed for the sender. This can be done both using a time window approach that emphasizes recently observed headers over very old headers, or an approach that takes into account all saved headers. Along with headers or portions of these, the data structure can store counts (e.g., how many times these were observed) and time intervals for the observations. For example, the number of times a particular message feature (e.g., message header item) was observed in received messages from the sender within a recent window of time (e.g., within a threshold time period and/or numerical count of past messages) and timestamps of each associated received message from the sender can be tracked and stored.

In some embodiments, statistics on the commonality of combinations of tracked aspects of messages (e.g., header entry, message body content, etc.) in an identity profile of a sender are determined and updated based on the newly received message. These statistics allow a determination of the likelihood that various aspects of a message would be observed together in the message. This also can be used to determine the likelihood that a new aspect detected in a message from the sender conforms to previously detected changes over time in previous messages from the sender. For example, this information can be used to determine the likelihood that the sender would change from one computing platform to another, the probability that the sender would upgrade their system, and the probability that the sender would use another machine temporarily. Thus message profile data of previously received messages from the sender can be used to determine a Bayesian probability score of a particular message feature being consistent with past observations for a communication between the sender and the recipient, given the context of other aspects of the message and a pattern of previous changes as a function of time.

In some embodiments, the identity profile of a user includes identifying content included in a message signature and updating a data structure that tracks observations about message signatures of messages from the user and associated context in which particular message signatures were utilized. For example, if a message signature that states "Sent from my iPhone" has been tracked and observed in a sufficient number of messages sent by the sender using a mobile phone message client and if a newly received message includes this signature but was sent using a desktop computer message client, this abnormality can be detected based on the historical observations about message signatures of the sender.

In some embodiments, if the identity profile associated with the sender of the message cannot be identified and/or obtained, this process ends and a general security analysis is performed using general factors associated with the sender of the message. For example, the message is analyzed to identify security risks without the benefit of an identity profile. However, generalized past observations about messages from the sender (e.g., generalized based on messages for other recipients from the sender) and/or an organization/domain of the sender may be utilized to analyze a message content keyword, a mail user agent, a time zone, an IP address, an X-header, supported character sets, a message signature, and any other information about the message to determine security risk. In some embodiments, analyzing the message for security risks includes performing a plurality of analyses and determining a risk component score for each of the analyses. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores.

At 456, a security risk assessment of the received message is performed at least in part by comparing the information of the received message with one or more corresponding entries of the identity profile identified for the sender of the received message. For example, identity associated information extracted from the header of the message is compared with the corresponding entries of the obtained identity profile to determine whether the extracted information of the received message conforms with what is known about the sender in the obtained identity profile. Based on how and which extracted information compares/matches with corresponding information in the identity profile, a likelihood that the message was actually authorized by the user of the identity profile is determined.

Performing the security risk assessment may include evaluating/performing one or more security rules and/or determining a risk value associated with the message. Examples of factors assessed during the security risk assessment of the received message include determining whether: the email address of the sender of the received message matches one of known/trusted/secure email addresses specified in the obtained identity profile; the device/software/network used to send the received message matches one of known/trusted/secure devices/software/networks specified in the obtained identity profile; an automation property (e.g., sent using API, script, etc.) of the message matches known/allowed automation properties specified in the obtained identity profile (e.g., if the message was sent via automation, determined whether sender is known to send messages via automation), etc.

By comparing the email account used to send the message with one of the known/trusted/secure email message accounts of the identity profile, a determination can be made that there is a likelihood a recipient may assume that the message came from a known person because the display name matches the known person despite the email address/account of the sender not matching a known email address/account stored in the identity profile for the known person. By comparing the network used to send the message with a known to be trusted network (e.g., access to the network only possible via secure authenticated access) or known to be commonly utilized using a trusted sender's account, a security assessment can be made regarding the message. For example, use of a trusted or known network in combination with other identity profile matching properties of the message can result in a determination that the message is likely an authorized message from a sender. By comparing the properties of a device/software used to send the message with a known to be trusted device/software (e.g., trusted MUA) or known to be commonly utilized according to the identity profile, a security assessment can be made regarding the message. For example, use of a trusted or known device/software in combination with other identity profile matching properties of the message can result in a determination that the message is likely an authorized message from a sender. In some embodiments, the identity profile identifies whether an automation has been or is authorized to be utilized by the user of the identity profile when the sender sends a message. For example, one or more x-header entries identify whether the message was automatically generated.

These entries may be identified based on keywords that identify that the message was generated using a script (e.g., generated using an API/PHP mailer/script). By comparing whether the message was sent using automation with whether the identity profile identifies whether an automation has been or is authorized to be utilized by the user of the identity profile, a security assessment can be made regarding the message. For example, the message is identified as suspicious if the message was sent using automation but an identity profile of the sender of the message does not indicate that the sender typically utilizes automation to send messages.

In another example, a security rule and/or risk score assessment factor may be based on how many emails they typically generate per time period; whom these emails are typically sent to; whether emails that are sent are more likely to be responses or not; whether the account owner typically sends a series of very similar messages to different recipients within a short period of time; whether the account owner commonly sends emails with potentially sensitive contents, such as emails referring to wire transfers, account numbers, etc.; and, based on the mail user agents (MUAs) recorded for outgoing messages, what types of devices the account owner typically uses, what servers and IP addresses he or she is associated with, and what service providers, such as wireless service providers are typically used. Similarly, other information associated with the headers, such as the recorded time zone, is observed and recorded; and the security service provider computes estimates of the speed of change of each of these metrics. For example, the security service provider can compute a measurement of the distribution of the frequency of changes between different types of MUAs used by the account holder. Whereas some users will mostly only use one device during one day, some will use several, and many will use different types of devices and service providers (e.g., wireless or cable service) based on the length of the email, the type and size of attachments, and more.

In some embodiments, characterizing information relating to the device identity, very conveniently, can be read out from the "mail user agent" (MUA), which is part of the headers of an email. The MUA identifies the mail reader utilized; its version; the type of character sets the mail reader supports; the name of a carrier; and more. By building a model of the MUAs associated with trusted users, a security control can determine whether a potentially deceptive email has an MUA that matches that of the "corresponding" trusted user or not. If the potentially deceptive email was sent by an attacker, the MUA most likely will not match; but if it was sent from a personal account of the trusted user, then it almost certainly will. The MUA extracted from the message can be compared with stored MUAs associated with the sender in the identity profile of the sender, and a security rule is triggered and/or a risk score assessment is performed based on the result.

However, it is not desirable for attackers to infer the expected MUAs of the users they wish to impersonate—and then masterfully mimic these users by setting the MUA that the security control expects. In some embodiments, when the received message is flagged as potentially deceptive, but is found to have the "right" MUA, then the security system can perform additional verifications. One example is by sending an automated response to the sending account, asking the user to respond to the email—from the "right" account. If the sender was benevolent, the security system will get a response—which will allow it to associate the personal account with the trusted user. But the attacker will not be able to respond from the trusted account.

The comparison of an identified profile stored MUA and an observed MUA does not have to be identical to be considered a match. For example, a user may have upgraded from one version of a software package to another, resulting in another MUA; similarly, a user may switch from one wireless service provider to another. There are many other examples of common and reasonable changes. Some changes, however, are very uncommon. For example, downgrading to a previous version of a software package is uncommon; also, the change from one type of operating system (such as iOS) to another (such as Android) at the same time as a dramatic change in IP address or locality is another uncommon change. The security system may store one or more sets of MUA for each observed account, where any account sending email to a protected organization would potentially be observed. However, in some contexts, only frequent senders are observed, or only senders that satisfy some criteria, such as belonging to a law firm, vendor, financial institution, or the protected organization itself are observed. Alternatively, any party that satisfies a closeness criteria is observed, where this can be the transmission (to or from) of a minimum number of messages, being in the address book of a protected recipient, and more.

The reason multiple MUA sets can be stored for each observed message account is that most users have multiple devices. A user that just started to be observed may not yet have a profile of MUAs associated with it, or the stored collection has not yet stabilized. During such a period, the system may not take any action on emails that are received, unless they are considered potentially deceptive. That means that a user that is not considered deceptive—e.g., its display name does not match any trusted sender of the recipient—but which does not have any MUAs recorded would not be considered a threat. The system may simply record the MUAs as they are observed. MUAs observed coming from confirmed secure identities, such as accounts of controlled parties who use DMARC with p=reject, can be immediately added to the list of MUAs of the associated sender account. In this example, a party is considered controlled if it has strict controls relating to how accounts are generated. For example, a typical enterprise would have strict controls over account creation, and only employees are able to get accounts with them; on the other hand, webmail providers such as Google Gmail do not have strict controls, and allow mostly anybody to get email accounts with them.

In some embodiments, there exists a plurality of aspects of the message to be analyzed using the obtained identity profile, and each aspect is analyzed to determine a risk component score associated with each component. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores. For example, there exists ten risk component scores and five of the component scores are only associated with a malware risk type, four of the component scores are only associated with a phishing risk type, and one of the component scores is associated with both the malware risk type and the phishing risk type. In this example, a total malware risk type score is calculated using the six of the ten risk component scores that are associated with the malware risk type while the total phishing risk type score is calculated using the five of the ten risk component scores that are associated with the phishing risk type.

In some embodiments, using past observation data (e.g., in the identity profile) obtained by profiling past messages from the sender to the specific recipient of the message, various data and statistics as well as clusters of metadata/configurations/content of messages that are likely to be observed together in combination in a message from the sender can be determined. For example, using past observation data generated by profiling past messages from the sender, statistics on the commonality of various combinations of metadata/configurations/content of messages have been determined and stored in a data structure. Using this information in combination with identified information in the contents and/or header of the message, a likelihood the received message conforms to a typical message from the sender for the intended recipient is determined. This likelihood takes into account statistics of likely changes over time. For example, the determined risk reflects the likelihood that the sender would change from one platform to another, the probability that the sender would upgrade their computer system, and the probability that the sender would use a new machine temporarily. Thus, a component risk score value for an aspect of the message may be computed using a Bayesian probability score of the particular observation/feature/content/metadata being consistent with past observations of communications between the sender and the recipient, given the context of other aspects of the message and a pattern of previous changes as a function of time. In some embodiments, past observation data about messages from the sender is analyzed to determine a probability that a combination of features/contents/metadata of the message being analyzed is likely to be exhibited together and this probability is utilized to determine a risk component score.

Therefore, in some embodiments, a risk is identified by determining the conditional probability of a set of message aspects, given the past observations relating to the sender, the sender's organization, and of users in general. It may also take into consideration the meaning of mismatches, e.g., upgrades and potential changes from one phone to another. IP addresses and associated IP traces may also be taken into consideration, along with data about the common case for the considered user. Any aberration is identified, and a risk score is computed from the conditional probability of the observations. This may be done by comparing the probability to at least one threshold and assigning an associated risk score, by algebraically converting the probability to a risk score, or a combination of these approaches. The risk score is also affected by the exposure of the recipient to attacks, message content, and other risk identifiers.

In an illustrative example, Alice and Bob regularly communicate with each other using email. For roughly 75% of the messages Alice sends to Bob, the message emanates from a mail client with mime version "1.0 (Mac OS X Mail 10.1\(3251\))" and with additional characteristics such as those shown in the "Mac" column of the table above. For roughly 25% of the messages Alice sends to Bob, the message emanates from a mail client with mime version "1.0" and with additional characteristics such as those shown in the "Android ph" column of the table above. Bob's system receives an email E1 from Alice that is sent from a mail client with characteristics such as those shown in the "Mac" column of the table above. This is considered consistent with Alice's past sending behavior, and E1 is delivered. Bob's system receives an email E2 from Alice, that is sent from a mail client with characteristics such as those shown in the "Mac" column of the table above, except that the message is associated with mime version "1.0 (Mac OS X Mail 9.1\(3121\))." This would correspond to a downgrade of Alice's system, as opposed to an upgrade. This is considered unusual, and a security action is initiated. The contents of E2 is scrutinized, both using an automated tool and using a manual audit by an admin, after which it is concluded that the message is safe, and is delivered. The new mail client characteristic is entered in a record associated with Alice, along with details relating to the message and its treatment. Bob's system receives an email E3 from Alice that is sent from a mail client with characteristics such as those shown in the "iphone" column of the table above. This is not an entry that is associated with Alice's past observations. In addition, it is known that Alice has an Android phone. This causes an escalation of the message scrutiny. The message is found to have content matching a content risk filter. The determination is that E3 is at high risk of being a message that comes from an ATOed system. An SMS verification message is sent to Alice's previously recorded phone number, and Alice's record is marked as being at high risk of being corrupted. E3 is not delivered, but Bob receives a message saying that a suspect message has been blocked by the system, and that the message came from Alice's account. Cindy also knows Alice, and Cindy receives an email E4 from Alice. The system looks up Alice's record and determines that her account is considered at high risk of being corrupted. The message E4 is automatically scrutinized, but does not match any rule associated with a high risk. Therefore, E4 is marked up with a warning "This message comes from an account that is temporarily associated with risk. Please proceed with caution. Before performing any sensitive action, please verify with the owner of the account." However, it turns out that Alice really did send E3, from her new phone. Accordingly, she confirms that E3 was sent by her. The security system delivers E3 to Bob, and replaces the marked-up version of E4 in Cindy's inbox with the "clean" version of E4. The system also removes the "corrupted" flag in the record associated with Alice, and records the header configuration associated with E3 in the record. The system does not know whether Alice will still use her Android phone. However, it knows from the response to the verification challenge—which was sent from an iPhone—that the phone number on record for Alice is likely to be associated with an iPhone, but that the phone associated with the "Android ph" device may also be used. Later on, Bob's system receives an email E5 from Alice, not matching any of the previously recorded headers, but instead matching a header configuration commonly used by previously observed scammers. The message scrutiny is escalated, and automated scrutiny indicates that E5 contains a zip file that, when decompressed in a sandbox, contains a malicious file. The system concludes that Alice's device has been corrupted, and adds information about this in the record associated with Alice. A notification message is sent to Alice using SMS. However, Alice does not respond to it. The security system initiates a notification to Alice's mail service provider, indicating that it is likely that Alice's system has been corrupted. Alice's mail service provider reviews the activity associated with Alice's account, and concludes that it is likely that Alice's account has been taken over. They automatically block access to the account and initiate an effort to allow Alice to regain access to her account. Several days later, this completes. Dave has not interacted with Alice in the past, but receives an email E6 from Alice. The system looks up Alice's record and determines that her account is considered at high risk of being corrupted. The message E6 is automatically scrutinized. It is found that it is identical to a message sent in the past from corrupted accounts. Therefore, E6 is not delivered. Alice's account sends another email E7 to Bob, which is trapped by the security system. It does not have content found to be dangerous, and so, is delivered along with a warning "This email was sent from a sender that may be hacked. Please proceed with caution." The system generates an inquiry to Alice's mail service provider whether the recovery has completed; when the mail service provider responds that Alice's system has been recovered, the flag associated with corruption in Alice's record is set to "none," and the modified message is searched for. However, the security system cannot find it, and so, does not replace it with its clean version E7.

In some embodiments, performing the security risk assessment includes determining whether the message was received from a sender that has an established relationship with an intended recipient of the message, and if it is determined that the message was received from the sender that has an established relationship contact with the intended recipient of the message, the message is analyzed for security risks using historical observations associated with the sender of the message with respect to the intended recipient of the message. In some embodiments, the sender of the message has an established relationship with the intended recipient of the message if the sender (e.g., from the email address of the sender) has sent a message to the intended recipient of the message (e.g., recipient email address of the message) a threshold number of times, if the intended recipient has previously sent a message to the sender a threshold number of times, and/or if the sender has been sending messages to the intended recipient of the message for a threshold length of time. For example, the sender of the message is the established relationship contact of the intended recipient of the message if a threshold number of messages has been exchanged between the sender and the recipient. The identity profile of the sender of the message can be utilized to determine whether the sender is an established relationship contact of an intended recipient of the message.

In various embodiments, in addition to using the identity profile associated with the sender of the message to analyze the security risk of the message, other types of security risk analysis are performed in determining a total risk score associated with the message. For example, in addition to one or more risk component scores for risk factors determined using past observations, one or more other risk component scores are determined for other types of security risk analysis. The various different types of risk component scores are combined to determine a total risk score. Examples of the other types of security risk analyses include a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

Figure 5:
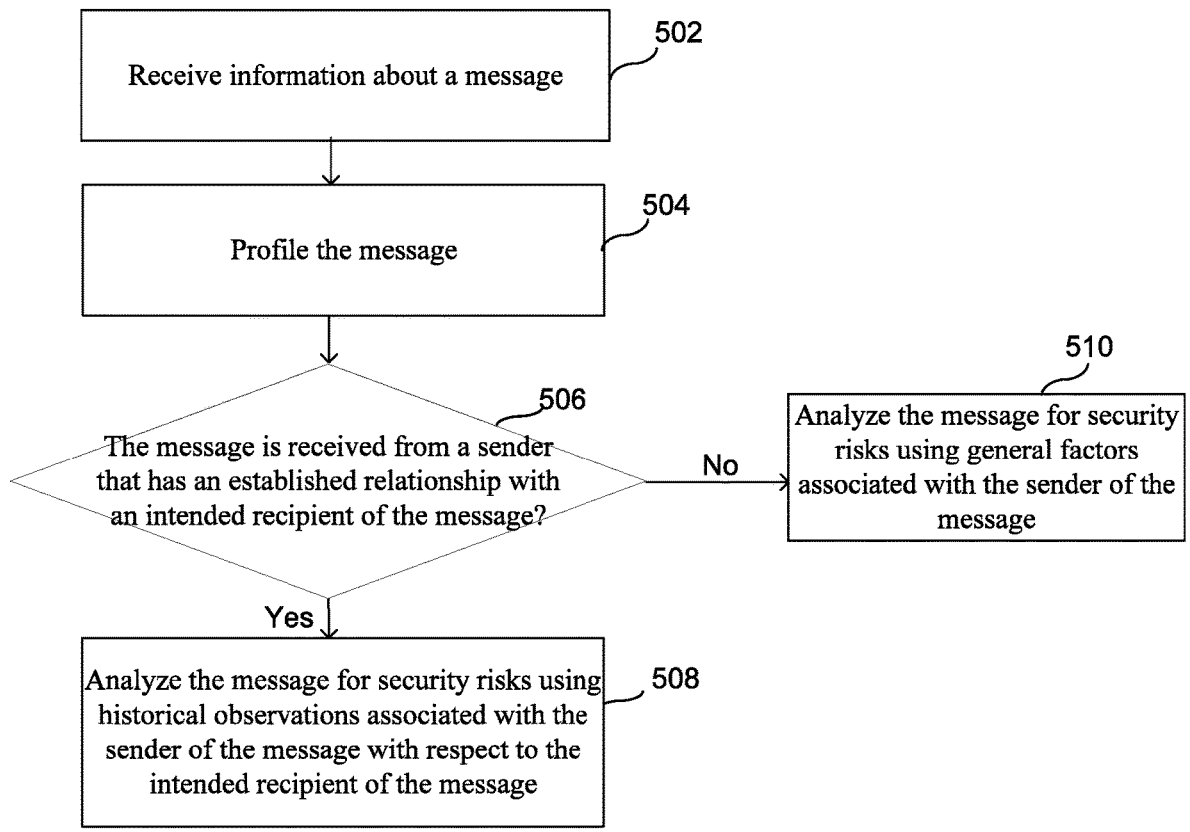
FIG. 5 is a flowchart illustrating an embodiment of a process for analyzing a received message for security risks.

FIG. 5 is a flowchart illustrating an embodiment of a process for analyzing a received message for security risks. For example, the process of FIG. 5 is utilized to detect account take-over risk of a sender of an electronic message and take responsive action to mitigate potential effects of the risk. The process of FIG. 5 may be at least in part implemented on analysis server 102, gateway 110, and/or message server 106 of FIG. 1. In some embodiments, at least a portion of the process of FIG. 5 is performed in 206 of FIG. 2. For example, the process of FIG. 5 is utilized to assess a security risk of a message included in the group of related messages. A security risk made about the message may then be attributed to the entire group of related messages for appropriate security action. In some embodiments, the received message in 202 of FIG. 2 and/or the seed message in 302 of FIG. 3 is a message that has been analyzed for security risks using the process of FIG. 5.

In some embodiments, a received electronic message is analyzed to identify signs indicative of a message coming from an ATOed message account. If the message is identified as being of a sufficient high risk of coming from an account that has been potentially ATOed, a security action is performed in an attempt to minimize a security risk associated with the message. It is desirable to reduce the false positives and false negatives such ATOed account detection.

In some embodiments, it is determined whether a sender of an electronic message has an established relationship with an intended recipient of the electronic message. For example, if the sender of the message has previously communicated with the intended recipient a sufficient number of times for at least a threshold length of time, the sender of the electronic message is determined to have an established relationship with the intended recipient. In response to a determination that the sender of the electronic message has an established relationship with the intended recipient, the electronic message is analyzed based at least in part on previously observed communication between the sender and the intended recipient to determine a security risk of the electronic message for the intended recipient. For example, given what is already known about the sender of the message based on a classification and analysis of previous communications between the sender and the intended recipient, it can be determined whether the newly received message conforms to a pattern detected in the previous communications. Based on the result of the analysis of the electronic message, a security action is performed, if applicable. For example, the electronic message may be blocked if a sufficiently high level of risk is detected and/or the message may be modified to include a warning about the ATOed account risk if a sufficient medium level of risk is detected based on the analysis. If no or a low level of risk is detected, the message may be allowed to be accessed by the intended recipient by delivering the message to a message inbox of the recipient.

In some embodiments, in response to a determination that the sender of the electronic message does not have an established relationship with the intended recipient, it is determined whether an electronic message account of the sender of the electronic message is likely an independently controlled account. For example, a message that was sent from an account that belongs to a large organization that closely controls who can send a message via its domain is not an independently controlled account whereas a personal email message account is an independently controlled account. In response to a determination that the electronic message account of the sender of the electronic message is likely an independently controlled account, the message is analyzed to determine whether the message is an automatically generated message. For example, a header of the message is analyzed to determine whether the message was automatically generated using a script or a program. In response to a determination that the message is an automatically generated message, a security action is performed. For example, the electronic message may be blocked if a sufficiently high level of risk is detected and/or the message may be modified to include a warning about a security risk if a sufficiently medium level of risk is detected based on the analysis. If no or a low level of risk is detected, the message may be allowed to be accessed by the intended recipient by delivering the message to a message inbox of the recipient.

At 502, information about a received message (e.g., message to be delivered to an intended recipient) is received. In some embodiments, the information is received at analysis server 102 of FIG. 1. The information may include information included in or related to the message. For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 504, the message is profiled. In some embodiments, step 504 is only performed if it is determined that a security risk associated with the message is below a threshold (e.g., risk score determined in 508 and/or 510 is below a threshold). Profiling the message includes storing information about and/or included in the message in a database to track historical observations about the sender of the message. For example, in identifying accounts that might have been ATOed, messages sent by the account are to be analyzed based on past observations about typical messages sent by the sender and the degree to which a newly received message from the sender deviates from what has been typically observed about messages sent by the account of the sender. In some embodiments, the historical information about messages by the sender for a particular recipient may be combined with historical information about messages sent by the sender for other recipients to determine a combined message profile/history of the sender for use in assessing security risk of messages by the sender for recipient without an established communication history with the sender. In some embodiments, profiling the message includes profiling, tracking and/or storing content and/or header information of the message in a data structure that tracks historical information about messages sent by the sender for a particular recipient. In some embodiments, profiling the message includes profiling, tracking and/or storing content included in the message in a data structure that tracks historical information about types of content typically included in messages sent by the sender for a particular recipient. For example, the data structure tracks keywords and/or content topic/type included in messages sent by the sender for a particular message recipient and keywords and/or content topic/type detected in the newly received message are used to update this data structure.

In some embodiments, at least a portion of header information of the message is stored in profiling the message. In some embodiments, select information included in the header of the message is tracked and associated with a history message profile of the sender. For example, information in the header of the message that identifies one or more of the following is tracked for the sender of the message: a mail user agent, a time zone, IP address, X-headers, supported character sets, and any desired information of interest in the header. One or more different profiles for the sender of the message may be updated using the message. For example, certain header information and/or content of messages of the sender may be correlated with each other and associated groups of header entries and/or content entries of messages of the sender are updated when profiling the message. In one example, different profiles of the sender are categorized based on different devices used by the sender to send messages to a particular recipient.

The table below shows different header information that is collected to build different profiles about messages sent using different devices of the sender.

| Feature | iphone | Mac | browser | iPad | Android phone |
|---|---|---|---|---|---|
| DKIM signature? | yes | yes | no | no | yes |
| Mime version | 1.0 (1.0) | 1.0 (Mac OS X Mail 10.1\ (3251\)) | 1.0 | 1.0 (1.0) | 1.0 |
| Content type | text/plain; charset = us-ascii | text/plain; charset = us-ascii | text/html; charset = UTF-8 | text/plain; charset = us-ascii | text/plain; charset = UTF-8 |
| X-Mailer | iPhone Mail (14B72) | Apple Mail (2.3251) | N/A | iPad Mail (14B100) | N/A |
| Message ID | Type 1 | Type 1 | Type 2 (both formatting and subdomain) | Type 1 | Type 2 (both formatting and subdomain) |
| Cipher | TLS1_2 | TLS1_2 | N/A | TLS1_2 | TLS1_2 |

This table shows that by recording the header entries historically associated with messages from the same sender, a prediction can be made in terms of whether a newly received message and aspects of the message in combination are consistent with the past observations. Each trusted sender that has sent a message to a specific recipient is associated with a record that describes what different header configurations have been observed for the sender. This can be done both using a time window approach that emphasizes recently observed headers over very old headers, or an approach that takes into account all saved headers. Along with headers or portions of these, the data structure can store counts (e.g., how many times these were observed) and time intervals for the observations. For example, the number of times a particular message feature (e.g., message header item) was observed in received messages from the sender within a recent window of time (e.g., within a threshold time period and/or numerical count of past messages) and timestamps of each associated received message from the sender can be tracked and stored.

In some embodiments, statistics on the commonality of combinations of tracked aspects of messages (e.g., header entry, message body content, etc.) of a sender are determined and updated based on the newly received message. These statistics allow a determination of the likelihood that various aspects of a message would be observed together in the message. This also can be used to determine the likelihood of a new aspect detect in a message from the sender conforms to previously detected changes over time in previous messages from the sender. For example, this information can be used to determine the likelihood that the sender would change from one computing platform to another, the probability that the sender would upgrade their system, and the probability that the sender would use another machine temporarily. Thus message profile data of previously received messages from the sender can be used to determine a Bayesian probability score of a particular message feature being consistent with past observations for a communication between the sender and the recipient, given the context of other aspects of the message and a pattern of previous changes as a function of time.

In some embodiments, profiling the message includes identifying content included in a message signature and updating a data structure that tracks observations about message signatures of messages from the sender and associated context in which particular message signatures were utilized. For example, if a message signature that states "Sent from my iPhone" has been tracked and observed in a sufficient number of messages sent by the sender using a mobile phone message client and if a newly received message includes this signature but was sent using a desktop computer message client, this abnormality can be detected based on the historical observations about message signatures of the sender.

At 506, it is determined whether the message was received from a sender that has an established relationship with an intended recipient of the message. In some embodiments, the sender of the message has an established relationship with the intended recipient of the message if the sender (e.g., from email address of the sender) has sent a message to the intended recipient of the message (e.g., recipient email address of the message) a threshold number of times, if the intended recipient has previously sent a message to the sender a threshold number of times and/or if the sender has been sending messages to the intended recipient of the message for a threshold length of time. For example, the sender of the message is the established relationship contact of the intended recipient of the message if a threshold number of messages have been exchanged between the sender and the recipient. In some embodiments, a sender model developed for the sender of the message is utilized to determine whether the sender is an established relationship contact of an intended recipient of the message.

In some embodiments, determining whether the message was received from an established relationship contact of an intended recipient of the message includes determining a trust score associated with the sender of the message for the intended recipient of the message. If the trust score is above a threshold, the sender is identified as having an established relationship with the recipient and otherwise, the sender is identified as not having an established relationship with the recipient. The trust score indicates the closeness of the relationship between the sender and the intended recipient. This can either be a binary predicate or a real number. In a simplified example, the trust score can be set to 1 (e.g., indicating established relationship) if each of the two parties has sent the other at least three messages over a course of no shorter than one month, and otherwise to 0 (e.g., indicating not an established relationship). In another example, the trust score can be a function of the number of messages received by the recipient organization sent by the sender's organization and the number of messages that have been identified as undesirable, whether by the classifier or by a recipient.

In some embodiments, the trust score of the message identifies the extent to which the system recognizes the sender based on its historical message traffic; as such, it may not be limited to the history of the recipient or her organization. For example, a message from a sender with a very brief history would receive a low trust score, especially if the communication pattern is similar to that of previously identified malicious senders. A sender with a longer history and low traffic volume (but very few or no complaints of past abuse) would have a higher trust score, and a sender with a long history, high volume, and few or no complaints would correspond to an even higher trust score.

In some embodiments, determining whether the sender of the message has an established relationship with the intended recipient includes determining whether the sender of the message is included in a contact list (e.g., address) of the intended recipient. For example, if the sender of message is included in the contact list of the intended recipient and a sufficient number of the message was previously exchanged between the sender and the recipient, it is determined that the sender has an established relationship with the recipient.

In some embodiments, determining whether the sender of the message has an established relationship with the intended recipient includes obtaining a social, organizational, communication, collaboration, business and/or other relationship information of the sender and/or the intended recipient. Information about the sender and/or other users connected/related to the intended recipient may be obtained by requesting the desired information from a service (e.g., an external third-party service accessed via an Application Programming Interface such as Microsoft Graph API). For example, an identifier of the intended recipient of the message is provided to the service, and the service provides a list of other users connected to the intended recipient (e.g., connected via a social network, organizational relationship, business contact, etc.) that is ordered by the various other user's relevance to the intended recipient (e.g., order based on previous communication, collaboration, business relationships, etc.). It is determined that the sender of the message has an established relationship with the intended recipient if the sender is included in this list as having a sufficient relationship with the intended recipient (e.g., included in the list). Otherwise it is determined that the sender of the message does not have an established relationship with the intended recipient. In another example, an identifier (e.g., email address) of the sender of the message is provided to the service and the service provides information about the sender (e.g., information about the sender gathered across various different message repositories, contact lists and social networks). This information about the sender is used to assess a strength of a relationship between the sender and the intended recipient of the message (e.g., along with message history between them), and if the strength value of the relationship is greater than a threshold value, it is determined that the sender of the message has an established relationship with the intended recipient. Otherwise it is determined that the sender of the message does not have an established relationship with the intended recipient.

If at 506, it is determined that the message was received from the sender that has an established relationship contact with the intended recipient of the message, at 508 the message is analyzed for security risks using historical observations associated with the sender of the message with respect to the intended recipient of the message.

An example of the historical observations is the historical observations updated in 504. The historical observations include information about messages from/to the sender of the message to/from the recipient of the received message. In some embodiments, there exists a plurality of aspects of the message to be analyzed using the historical observations, and each aspect is analyzed to determine a risk component score associated with each component. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores. For example, there exists ten risk component scores and five of the component scores are only associated with a malware risk type, four of the component scores are only associated with a phishing risk type, and one of the component scores is associated with both the malware risk type and the phishing risk type. In this example, a total malware risk type score is calculated using the six of the ten risk component scores that are associated with the malware risk type while the total phishing risk type score is calculated using the five of the ten risk component scores that are associated with the phishing risk type. Examples of the aspects of the message analyzed using historical observations include message content keyword, a mail user agent, a time zone, an IP address, an X-header, supported character sets, a message signature, and any information about the message.

In some embodiments, using past observation data generated by profiling past messages from the sender to the specific recipient of the message, various data and statistics as well as clusters of metadata/configurations/content of messages that are likely to be observed together in combination in a message from the sender can be determined. For example, using past observation data generated by profiling past messages from the sender, statistics on the commonality of various combinations of metadata/configurations/content of messages have been determined and stored in a data structure. Using this information in combination with identified information in the contents and/or header of the message, a likelihood the received message conforms to a typical message from the sender for the intended recipient is determined. This likelihood takes into account statistics of likely changes over time. For example, the determined risk reflects the likelihood that the sender would change from one platform to another, the probability that the sender would upgrade their computer system, and the probability that the sender would use a new machine temporarily. Thus, a component risk score value for an aspect of the message may be computed using a Bayesian probability score of the particular observation/feature/content/metadata being consistent with past observations of communications between the sender and the recipient, given the context of other aspects of the message and a pattern of previous changes as a function of time. In some embodiments, past observation data about messages from the sender is analyzed to determine a probability that a combination of features/contents/metadata of the message being analyzed is likely to be exhibited together and this probability is utilized to determine a risk component score.

Therefore, in some embodiments, a risk is identified by determining the conditional probability of a set of message aspects, given the past observations relating to the sender, the sender's organization, and of users in general. It may also take into consideration the meaning of mismatches, e.g., upgrades and potential changes from one phone to another. IP addresses and associated IP traces may also be taken into consideration, along with data about the common case for the considered user. Any aberration is identified, and a risk score is computed from the conditional probability of the observations. This may be done by comparing the probability to at least one threshold and assigning an associated risk score, by algebraically converting the probability to a risk score, or a combination of these approaches. The risk score is also affected by the exposure of the recipient to attacks, message content, and other risk identifiers.

In an illustrative example, Alice and Bob regularly communicate with each other using email. For roughly 75% of the messages Alice sends to Bob, the message emanates from a mail client with mime version "1.0 (Mac OS X Mail 10.1\(3251\))" and with additional characteristics such as those shown in the "Mac" column of the table above. For roughly 25% of the messages Alice sends to Bob, the message emanates from a mail client with mime version "1.0" and with additional characteristics such as those shown in the "Android ph" column of the table above. Bob's system receives an email E1 from Alice that is sent from a mail client with characteristics such as those shown in the "Mac" column of the table above. This is considered consistent with Alice's past sending behavior, and E1 is delivered. Bob's system receives an email E2 from Alice, that is sent from a mail client with characteristics such as those shown in the "Mac" column of the table above, except that the message is associated with mime version "1.0 (Mac OS X Mail 9.1\(3121\))." This would correspond to a downgrade of Alice's system, as opposed to an upgrade. This is considered unusual, and a security action is initiated. The contents of E2 is scrutinized, both using an automated tool and using a manual audit by an admin, after which it is concluded that the message is safe, and is delivered. The new mail client characteristic is entered in a record associated with Alice, along with details relating to the message and its treatment. Bob's system receives an email E3 from Alice that is sent from a mail client with characteristics such as those shown in the "iphone" column of the table above. This is not an entry that is associated with Alice's past observations. In addition, it is known that Alice has an Android phone. This causes an escalation of the message scrutiny. The message is found to have content matching a content risk filter. The determination is that E3 is at high risk of being a message that comes from an ATOed system. An SMS verification message is sent to Alice's previously recorded phone number, and Alice's record is marked as being at high risk of being corrupted. E3 is not delivered, but Bob receives a message saying that a suspect message has been blocked by the system, and that the message came from Alice's account. Cindy also knows Alice, and Cindy receives an email E4 from Alice. The system looks up Alice's record and determines that her account is considered at high risk of being corrupted. The message E4 is automatically scrutinized, but does not match any rule associated with a high risk. Therefore, E4 is marked up with a warning "This message comes from an account that is temporarily associated with risk. Please proceed with caution. Before performing any sensitive action, please verify with the owner of the account." However, it turns out that Alice really did send E3, from her new phone. Accordingly, she confirms that E3 was sent by her. The security system delivers E3 to Bob, and replaces the marked-up version of E4 in Cindy's inbox with the "clean" version of E4. The system also removes the "corrupted" flag in the record associated with Alice, and records the header configuration associated with E3 in the record. The system does not know whether Alice will still use her Android phone. However, it knows from the response to the verification challenge—which was sent from an iPhone—that the phone number on record for Alice is likely to be associated with an iPhone, but that the phone associated with the "Android ph" device may also be used. Later on, Bob's system receives an email E5 from Alice, not matching any of the previously recorded headers, but instead matching a header configuration commonly used by previously observed scammers. The message scrutiny is escalated, and automated scrutiny indicates that E5 contains a zip file that, when decompressed in a sandbox, contains a malicious file. The system concludes that Alice's device has been corrupted, and adds information about this in the record associated with Alice. A notification message is sent to Alice using SMS. However, Alice does not respond to it. The security system initiates a notification to Alice's mail service provider, indicating that it is likely that Alice's system has been corrupted. Alice's mail service provider reviews the activity associated with Alice's account, and concludes that it is likely that Alice's account has been taken over. They automatically block access to the account and initiate an effort to allow Alice to regain access to her account. Several days later, this completes. Dave has not interacted with Alice in the past, but receives an email E6 from Alice. The system looks up Alice's record and determines that her account is considered at high risk of being corrupted. The message E6 is automatically scrutinized. It is found that it is identical to a message sent in the past from corrupted accounts. Therefore, E6 is not delivered. Alice's account sends another email E7 to Bob, which is trapped by the security system. It does not have content found to be dangerous, and so, is delivered along with a warning "This email was sent from a sender that may be hacked. Please proceed with caution." The system generates an inquiry to Alice's mail service provider whether the recovery has completed; when the mail service provider responds that Alice's system has been recovered, the flag associated with corruption in Alice's record is set to "none," and the modified message is searched for. However, the security system cannot find it, and so, does not replace it with its clean version E7.

In various embodiments, in addition to using historical observations associated with the sender of the message to analyze the security risk of the message, other types of security risk analysis are performed in determining a total risk score associated with the message. For example, in addition to one or more risk component scores for risk factors determined using past observations, one or more other risk component scores are determined for other types of security risk analysis. The various different types of risk component scores are combined to determine a total risk score. Examples of the other types of security risk analysis include a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

If at 506 it is determined that the message was received from a sender that does not have an established relationship with the intended recipient of the message, at 510, the message is analyzed for security risks using general factors associated with the sender of the message. For example, the message is analyzed to identify security risks without the benefit of observations of previous communication history between the sender of the message and the intended recipient of the message. However, generalized past observations about messages from the sender (e.g., generalized based on messages for other recipients from the sender) and/or an organization/domain of the sender is utilized to analyze a message content keyword, a mail user agent, a time zone, an IP address, an X-header, supported character sets, a message signature, and any other information about the message to determine whether the message is sufficiently different from the generalized past observations to indicate a security risk. In some embodiments, analyzing the message for security risks includes performing a plurality of analyses and determining a risk component score for each of the analyses. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores.

In some embodiments, in 510, it is determined whether the electronic message account of the sender of the message is likely an independently controlled account. For example, an account that belongs to a large organization that closely controls who can send a message via its domain is not an independently controlled account whereas a personal email message account is an independently controlled account. In response to a determination that the electronic message account of the sender of the electronic message is likely an independently controlled account, the message is analyzed to determine whether the message is an automatically generated message. For example, a header of the message is analyzed to determine whether the message was automatically generated using a script or a program. In response to a determination that the message is an automatically generated message, a risk component score of the message is set to be high enough to warrant performing a security action.

In various embodiments, examples of other types of analyses performed in 510 include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message (e.g., attacker may prefer targeting people one by one, to avoid detection), and determining whether the sender from a domain with a Domain-based Message Authentication, Reporting and Conformance (DMARC) policy passes Sender Policy Framework (SPF) and DomainKeys Identified Mail (DKIM) validations.

Figure 6:
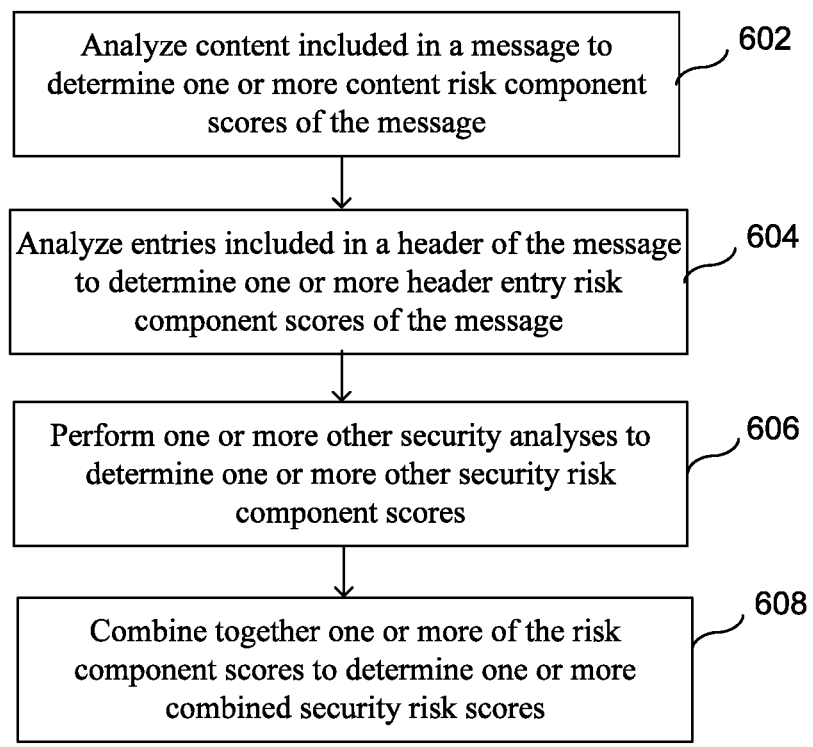
FIG. 6 is a flowchart illustrating an embodiment of a process for analyzing individual aspects of a message for security threats.

FIG. 6 is a flowchart illustrating an embodiment of a process for analyzing individual aspects of a message for security threats. The process of FIG. 6 may be at least in part implemented on analysis server 102, gateway 110, and/or message server 106 of FIG. 1. In some embodiments, at least a portion of the process of FIG. 6 is performed in 510 of the process of FIG. 5.

At 602, content included in a message is analyzed to determine one or more content risk component scores of the message. For example a message body of the message is analyzed to identify whether it includes one or more text/keywords from a list of keywords associated with a security risk. A keyword may be included in the list because the keyword identifies conversations about sensitive content that could cause harm to the recipient if the recipient replies or takes action related to the keyword. For example, keywords "social security number," "password," "login," "wire instructions," "confidential," "payment," "ID," obfuscated text, etc. may be included in the list of keywords associated with a security risk. A content risk component score is determined based on whether the message includes a text/keywords from the list of keywords (or associated synonyms or related words) associated with a security risk. For example, an increase in the number (e.g., of different types) and degree of risk of security risk keywords included in the message increases the associated content risk component score.

If the sender of the message has been determined to have an established relationship with the recipient of the message, past observations about messages sent by the sender are utilized in determining the content risk component score based on whether the message includes a text/keywords from the list of keywords (or associated synonyms or related words) associated with a security risk. For example, if it is common for a sender to communicate with the recipient about invoices and payment, an inclusion of a keyword related to invoices and payment would not cause the content risk component score to go up as much as compared to a situation in which it is not common for sender to communicate with the recipient about invoices and payment. Thus a contribution of a security risk keyword included in the message to the content risk component score is reduced if the same or similar keyword in scope and topic (e.g., keyword that is a synonym or topically related word) has been previously observed in previous messages from/to the sender to/from the recipient. The magnitude of this reduction may depend on the number and length of time the same or similar keyword in scope and topic has been previously observed in previous messages from/to the sender to/from the recipient.

In some embodiments, analyzing content included in the message to determine one or more content risk component scores of the message includes determining a content risk component score based on a message signature included in the message. For example based on past observations about types of email signatures typically included in email messages from the sender of the message, the associated content risk component score is increased if an expected signature is not included in the message (e.g., given other detected attributes of the message and the expected signature for the given other detected attributes) or if an unexpected signature is detected (e.g., never observed signature or included signature is an out of context signature that does not match an expected signature for the given detected attributes of the message).

At 604, entries included in a header of the message are analyzed to determine one or more header entry risk component scores of the message. Examples of the entries included in the analyzed header include one of more of the following: a mail user agent (i.e., MUA) identification, time zone identification, IP address, X-header, supported foreign language character sets of the sender, identification of automation or script that generated the message, or any other data included in the header (e.g., email header) of the message. For each header entry to be analyzed, a header entry risk component score is calculated based on a risk factor associated with the entry. For example, certain sender IP addresses and/or header entries, given what is known about the intended recipient (e.g., mismatch between sender and recipient) may increase the associated header entry risk component score. If the sender of the message has been determined to have an established relationship with the recipient of the message, past observations about headers of messages sent by the sender are utilized in determining the header entry risk component scores. For example, the header entry risk component score for a header entry is reduced if the same or similar entry (e.g., change in entry from a previously observed entry conforms to known change pattern) has been previously observed in previous message headers of messages from the sender of the message. The magnitude of this reduction may depend on degree of similarity and/or conformance to a typical pattern of change from previous observations.

In some embodiments, the header entry risk component score for a header entry is associated with whether the message is an automatically generated message. For example, one or more x-header entries identify whether the message was automatically generated. These entries may be identified based on keywords that identify that the message was generated using a script (e.g., generated using a PHP mailer/script). If the sender of the message has been determined to have an established relationship with the recipient of the message, past observations about headers of messages sent by the sender are utilized in determining the header entry risk component scores. For example, the header entry risk component score for a header entry identifying an automatically generated message is reduced if the sender typically sends automatically generated messages (e.g., including the same or similar header entry) to the recipient of the message. The magnitude of this reduction may depend on degree of similarity and/or conformance to a typical pattern of change from previous observations. The following are examples of header entries identifying an automatically generated message and these entries are identified by matching one or more search terms with at least a portion of the text of these entries: "X-Mailer: PHPMailer 5.2.23 (https://github.com/PHPMailer/PHPMailer)"; "X-Php-Originating-Script: 1002:srjvdopc.php(1189):runtime-created function (1): eval( )'d code(1): eval( )'d code."

At 606, one or more other security analyses are performed to determine one or more other security risk component scores. This step may be optional in various embodiments. Examples of other types of analysis performed include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

In some embodiments, performing a security analysis includes identifying which domains and subdomains are used to send legitimate traffic, e.g., by recording what subdomains/domains are used to originate large volumes of emails, and which are not known to be spam or fraud email. For example, "large amounts" may mean greater than a threshold value, such as 100 emails per week, or at least 0.1% of the traffic associated with a particular domain, or any traffic that is not known to be good, e.g., by being associated with correct SPF and/or DKIM data in the headers. Next, any traffic associated with a subdomain and domain that is not on the list of subdomains/domains that are known to send legitimate traffic is flagged, and, depending on a policy and/or contents, quarantined, blocked, marked up, or escalated for additional scrutiny.

In some embodiments, a security analysis involves web bugs, which are also referred to as web trackers. Some users set their browser preferences not to permit web bugs, whereas others do not. Therefore, the acceptance or rejection of a web bug is a trait that can be tracked. When it changes, that is indicative of risk. A web bug can be set to send a signal to the security service when the email or webpage in which it is integrated is rendered. The security service can send a message to a user considered at risk for having been corrupted, and then determine whether the web bug is operating in a manner that is consistent with past uses. The email can also demand that the user allows web bugs, after which user-specific information can be collected. If this is found to be inconsistent with past observations, the associated risk component score is increased.

At 608, one or more of the risk component scores are combined together to determine one or more combined security risk scores. Determining a combined security risk score includes statistically combining (e.g., adding together, weighting then adding together, averaging, weighted averaging, etc.) together the various risk component scores to determine a single combined risk score. In some embodiments, each of the risk component score(s) is associated with one or more specific types of risk. For example, risk component scores of each risk type are to be combined together by type to determine a total risk score for each specific risk type. For example, a security risk component score may be identified as being associated with a malware risk type and/or a phishing risk type and a combined security risk score for the malware risk type and a separate combined security risk score for the phishing risk type are calculated. In some embodiments, the combined security risk scores are utilized in determination of which security action to perform in 206 of FIG. 2.

Figure 7:
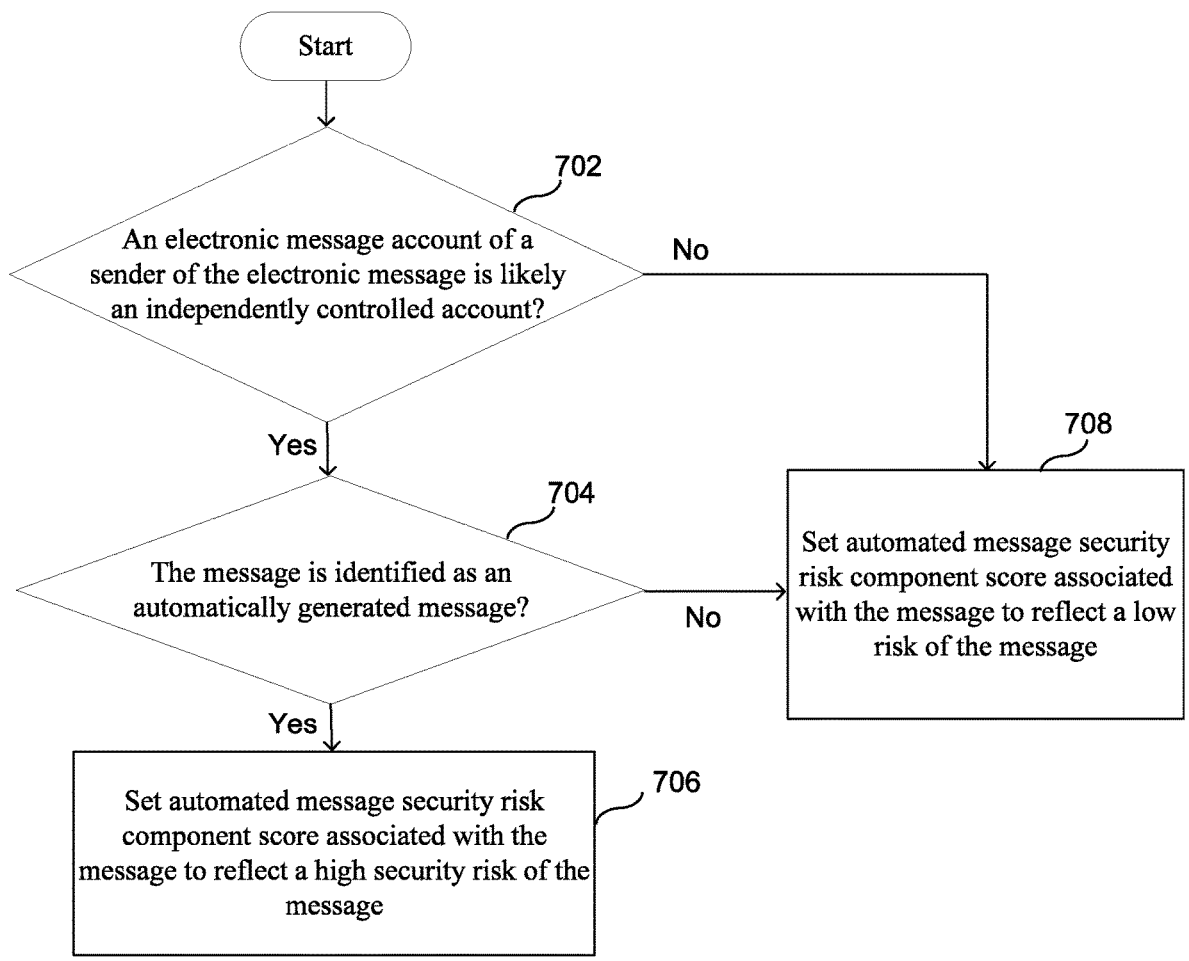
FIG. 7 is a flowchart illustrating an embodiment of a process for analyzing aspects of a received message based on whether the message is from an independently controlled account of a sender.

FIG. 7 is a flowchart illustrating an embodiment of a process for analyzing aspects of a received message based on whether the message is from an independently controlled account of a sender. The process of FIG. 7 may be at least in part implemented on analysis server 102, gateway 110, and/or message server 106 of FIG. 1. In some embodiments, at least a portion of the process of FIG. 7 is performed in 508 and/or 510 of the process of FIG. 5. For example, the process of FIG. 7 is performed in response to a determination that the sender of the electronic message is not an established communication contact of the intended recipient of the message.

At 702, it is determined whether an electronic message account of a sender of the electronic message is likely an independently controlled account. For example, a message that was sent from an account that belongs to a large organization that closely controls who can send a message via its domain (e.g., web domain) is not an independently controlled account whereas a personal email message account is an independently controlled account.

In some embodiments, determining whether the electronic message account of a sender of the electronic message is likely an independently controlled account includes identifying a domain of an address (e.g., email address) of the sender of the message using the domain to identify using preconfigured data, whether the domain corresponds to independently controlled accounts. For example, certain domains are known to only allow not independently controlled accounts and any email address using these domains is identified as not an independently controlled account, while other domains are known to allow independently controlled accounts and any email address using these domains are identified as an independently controlled account. If the domain is unknown, the electronic message account of the sender is identified as an independently controlled account.

In some embodiments, the electronic message account of the sender of the electronic message is determined to be likely an independently controlled account based on a message traffic pattern associated with the electronic message account of the sender. For example, based on the volume of messages (e.g., large volume of message traffic above a threshold to/from the sender indicates that it is not an independently controlled account) and/or number/ratio of sent messages vs. received messages (e.g., a ratio of sent messages by the sender as compared to messages to the sender that is above a threshold indicates that it is not an independently controlled account where as a generally even ratio of sent vs. received indicates an independently controlled account), it is determined whether the electronic message account of the sender of the electronic message is likely an independently controlled account.

The notion of autonomy (e.g., independently controlled) of an account is important with respect to trust of the account. For example, a Google Gmail account is autonomous (e.g., independently controlled). Even though many members share the same domain, there is no coherency in their actions. On the other hand, an official work organization email address of one employee is not autonomous from another employee of the same organization.

In a first example, consider Alice with an email address with the domain "Aliceco.com" that sends an email to Bob at an email address with the domain "Bobco.com." Assume that the recipient Bob has a trust relationship with Alice (i.e., the recipient email address for Bob has sufficient interaction with the Alice email account). Then there is "personal trust" by the recipient directed to the sender. Assume that the recipient does not have a trust relationship with Alice, but somebody else at "Bobco.com" does. Then there is "organizational trust" by the recipient directed to the sender. Assume now that the recipient Cindy at "Bobco.com" has no trust relationship with Alice, but Cindy does have one with Dave at Aliceco.com. Then there is "personal transitive trust" by the recipient directed to the sender. This is because Alice and Dave both belong to "Aliceco.com," and "Aliceco.com" is one autonomous entity—Alice and Dave are not two independent autonomous entities. Finally, assume that the recipient has no trust relationship with either Alice or Dave—or anybody else at "AliceCo.com"—but that somebody else at "Bobco.com" does. This shows "organizational transitive trust."

In another example, consider Bob using his Google Gmail ("gmail") personal account, sends an email to somebody at "Bobco.com." Assume that the recipient has a trust relationship with Bob (e.g., the recipient email address has sufficient interaction with the Bob "gmail" email account). Then there is "personal trust" by the recipient directed to the sender. Assume that the recipient does not have a trust relationship with Bob's "gmail" account, but somebody else at "Bobco.com" does. Then there is "organizational trust" by the recipient directed to the sender. Assume now that the recipient has no trust relationship with Bob, but they do have one with Cindy's personal "hotmail" account. There is no trust—

Bob and Cindy are not two independent autonomous entities when represented by their personal email addresses.

Thus if an email comes from a stranger whose email address is similar to a party the recipient trusts, then this is a high-risk scenario. Trust is different from more general reputation: one is not more likely to act on an email from a trustworthy but unknown organization than one of an email from a non-trustworthy and unknown organization. However, whether one has a good relationship with a sender matters more in terms of trust than whether others have a good relationship with the sender. Different kinds of trusts may be computed in different ways but also have different strengths. For example: strength ("personal trust")>strength ("organizational trust"); strength ("personal trust")>strength ("personal transitive trust"); strength ("personal transitive trust")>strength ("organizational transitive trust"); strength ("organizational trust")>strength ("organizational transitive trust"). In some embodiments, different weights can be assigned to these different types of trust to determine a risk of a message.

If at 702 it is determined that the electronic message account of the sender of the electronic message is likely an independently controlled account, at 704, the message is analyzed to determine whether the message is an automatically generated message. For example, a header of the message is analyzed to determine whether one or more x-header entries identify whether the message was automatically generated. These entries may be identified based on keywords that identify that the message was generated using a script (e.g., generated using a PHP mailer/script). The following are examples of header entries identifying an automatically generated message and these entries are identified by matching one or more search terms/keywords with at least a portion of the text of these entries: "X-Mailer: PHPMailer 5.2.23 (https://github.com/PHPMailer/PHP-Mailer)"; "X-Php-Originating-Script: 1002:srjvdopc.php (1189): runtime-created function (1):eval( )'d code(1): eval( )'d code."

In some embodiments, determining whether the message is an automatically generated message includes identifying a likely scripted behavior associated with a protected account. For example, attackers typically configure accounts they have compromised to forward emails to another account, either selectively (such as based on the subject line, the sender, the thread, etc.) or for all emails. In addition, attackers sometimes configure compromised accounts so that selective emails are hidden, as will be described in more detail below. When attackers make such a configuration, then this affects the traffic patterns in a way that will be measured and detected by the security service. By monitoring the different mail folders, including the inbox, the sent box, the archive, the trash folder and other folders, the security service provider will detect forwarding behavior that is anomalous in that it has not been performed by the account owner before; that is selective; that is rapid; or that is to recipients that are considered high risk, or any combination of these. It also detects signs of scripted forwarding, which is indicated by a very short time period between receipt of an email and the forwarding of the email. In addition, the security service also looks for other indications of scripted behavior, such as an anomalous addition of an account in the bcc, which is considered anomalous by not having been performed previously, and/or which is considered scripted due to the time periods being very short. Another related detection method is to observe if the MUA of emails to some recipients of emails sent from the protected account are different than those of others, and considered high risk, e.g., due to information that is anomalous for the account owner.

If at 704 it is determined that the message is an automatically generated message, at 706, an automated message security risk component score associated with the message is set (e.g., set to a high value) to reflect a high security risk of the message (e.g., higher than otherwise). This security risk component score may be utilized in 608 of FIG. 6.

If at 702 it is determined that the electronic message account of the sender of the electronic message is likely not an independently controlled account or if at 704, it is determined that the message is not an automatically generated message, at 708, the automated message security risk component score associated with the message is set to reflect a low risk of the message (e.g., lower than otherwise).

Figure 8:
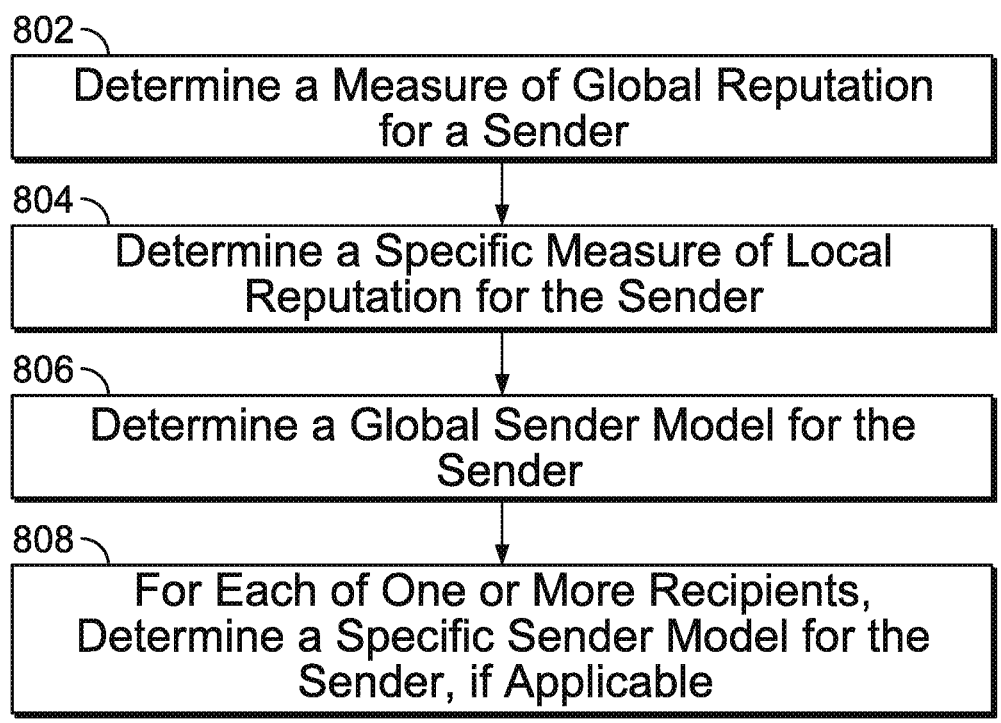
FIG. 8 is a flowchart illustrating an embodiment of a process for determining information about a message sender to be utilized to assess a risk of a message.

FIG. 8 is a flowchart illustrating an embodiment of a process for determining information about a message sender to be utilized to assess a risk of a message. The process of FIG. 8 may be at least in part implemented on analysis server 102, gateway 110, and/or message server 106 of FIG. 1. In some embodiments, at least a portion of the process of FIG. 8 may be performed in 506 FIG. 5.

At 802, a measure of global reputation for a sender is determined. The sender may correspond to a group of individual sender addresses in some embodiments or an individual sender address in other embodiments. For example, the sender corresponds to a trusted contact in a list of trusted contacts. In another example, the sender corresponds to a domain of a trusted contact. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 804) for the sender determined for each recipient of a group of different recipients to determine a combined measure (e.g., combined score).

At 804, a specific measure of local reputation for the sender is determined for each of one or more different recipients. For example, although the measure of global reputation determined in 802 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 702 of the process of FIG. 7. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 806, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 808, a specific sender model for the sender is determined for each of one or more recipients, if applicable. For example, although the sender model determined in 806 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 806 except for utilizing data specific to the recipient rather than various different recipients. For example, using a repository storing messages received from the sender to only the recipient, individual or neighborhoods of IP addresses associated with the sender model for a sender are automatically determined.

Figure 9:
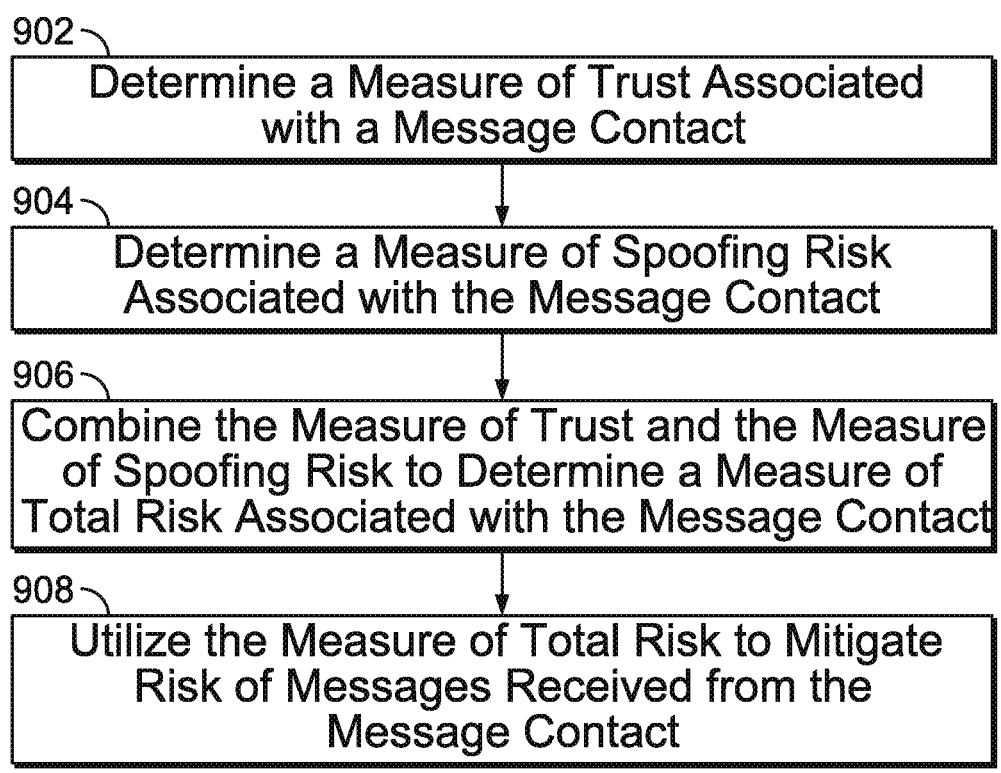
FIG. 9 is a flowchart illustrating an embodiment of a process for determining a total risk measure of a contact.

FIG. 9 is a flowchart illustrating an embodiment of a process for determining a total risk measure of a contact. The process of FIG. 9 may be at least in part implemented on analysis server 102, gateway 110, and/or message server 106 of FIG. 1. At least a portion of the process of FIG. 9 may be performed in one or more steps of the process of FIG. 5 (e.g., in 506, etc.).

At 902, a measure of trust associated with a message contact (e.g., sender of a message) is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 8. For example, the measure of trust is the specific measure of local reputation determined in 804. In another example, the measure of trust is the measure of global reputation included in the global sender model determined in 806. In another example, the measure of trust is determined based on a combination (e.g., average, sum, product, etc.) of the measure of global reputation and the specific measure of local reputation.

At 904, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 906, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 908, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a group of related messages that are identified as malicious based at least in part on identified behavior detected based on a plurality of messages of the group of related messages, wherein the identified behavior comprises a determination of whether a message send rate for a sender domain of the plurality of messages of the group of related messages exceeds a first threshold but is below a second threshold, the message send rate comprising a number of different recipients that the sender domain has sent messages to, the messages comprising a set of messages where each message of the set of messages has subject text with a measure of similarity above a similarity threshold to subject text of each other message in the set of messages;
    receiving information associated with a received message;
    determining whether the received message has the identified behavior and is a part of the group of related messages by having a subject text with a current measure of similarity above the similarity threshold to the messages in the group of related messages, and wherein determining that the received message is a part of the group of related messages further comprises determining that the received message failed at least one of Sender Policy Framework (SPF) or Domain-Keys Identified Mail (DKIM) authentication checks, and that the sender domain of the received message publishes a Domain-based Message Authentication, Reporting and Conformance (DMARC) policy requiring enforcement; and based on a determination that the received message has the identified behavior, is a part of the group of related messages by having the subject text with the current measure of similarity above the similarity threshold to the messages in the group of related messages, and that the received message failed at least one of SPF or DKIM authentication checks while the sender domain publishes an enforcing DMARC policy, performing a security action for the received message.

2. The method of claim 1, wherein the group of related messages is a malicious message campaign sent by a common entity to different recipients.

3. The method of claim 1, wherein the received message has been identified as malicious after determining whether the message is a part of the group of related messages.

4. The method of claim 1, wherein the received message has been identified as malicious prior to determining whether the message is a part of the group of related messages.

5. The method of claim 1, wherein the threshold is a dynamically determined value based on a domain of the sender of the plurality of messages of the group of related messages.

6. The method of claim 1, wherein the profile tracks one or more of the following for a domain or a message address of the sender: a rate of messages sent to new organizations/domains, one or more display names utilized, one or more replies to addresses, one or more times of day when messages are sent, one or more topics of message subject lines, one or more geographical locations from which messages are sent, one or more attributes of machines utilized to send messages, one or more sender IP addresses, one or more message metadata, and one or more message content signatures.

7. The method of claim 1, wherein performing the security action includes attributing a security determination made for the received message to another message of the group based on its inclusion in the group.

8. The method of claim 1, wherein performing the security action includes performing one or more of the following: blocking the received message, quarantining the received message, deleting the received message, routing the received message for further analysis/review, or modifying the received message.

9. The method of claim 1, wherein determining whether the received message is a part of the group of related messages includes determining whether a message send rate associated with a sender of the received message exceeds a dynamically determined threshold.

10. The method of claim 1, wherein determining whether the received message is a part of the group of related messages includes performing a machine learning clustering.

11. The method of claim 1, wherein determining whether the received message is a part of the group of related messages includes determining a set of a logical predicates that identify the group of related messages.

12. The method of claim 11, wherein determining the set of logical predicates includes evaluating a candidate logical predicate based on a number of matching messages among a repository of previously received messages.

13. The method of claim 12, wherein the candidate logical predicate is selected to be included in the set of logical predicates in response to a determination that the number of matching messages is greater than zero and less than a threshold limit.

14. The method of claim 11, wherein determining the set of logical predicates includes determining a signature of the group of related messages including by determining an efficient representation of the set of logical predicates, and the signature of the group of related messages is utilized to identify a new message matching the group of related messages.

15. The method of claim 11, wherein determining the set of logical predicates includes utilizing a plurality of different messages included in the set of a logical predicates as different seed messages in evaluating different logical predicates for inclusion in the set of logical predicates.

16. The method of claim 1, wherein the identified behavior further comprises having a measure of total risk that exceeds a risk threshold, and wherein determining whether the received message is part of the group of related messages comprises:

determining a measure of trust associated with a sender of the received message;

determining a measure of spoofing risk associated with the sender of the received message;

determining a measure of total risk for the received message based on the measure of trust and the measure of spoofing risk associated with the sender of the received message; and determining that the measure of total risk for the received message exceeds the risk threshold.

17. A system, comprising:

a processor configured to:

determine a group of related messages that are identified as malicious based at least in part on identified behavior detected based on a plurality of messages of the group of related messages, wherein the identified behavior comprises a determination of whether a message send rate for a sender domain of the plurality of messages of the group of related messages exceeds a first threshold but is below a second threshold, the message send rate comprising a number of different recipients that the sender domain has sent messages to, the messages comprising a set of messages where each message of the set of messages has subject text with a measure of similarity above a similarity threshold to subject text of each other message in the set of messages;

receive information associated with a received message;

determine whether the received message has the identified behavior and is a part of the group of related messages by having a subject text with a current measure of similarity above the similarity threshold to the messages in the group of related messages, and wherein determining that the received message is a part of the group of related messages further comprises determining that the received message failed at least one of Sender Policy Framework (SPF) or DomainKeys Identified Mail (DKIM) authentication checks, and that the sender domain of the received message publishes a Domain-based Message Authentication, Reporting and Conformance (DMARC) policy requiring enforcement; and based on a determination that the received message has the identified behavior, is a part of the group of related messages by having the subject text with the current measure of similarity above the similarity threshold to the messages in the group of related messages, and that the received message failed at least one of SPF or DKIM authentication checks while the sender domain publishes an enforcing DMARC policy, perform a security action for the received message; and a memory coupled to the processor and configured to provide the processor with instructions.

18. A computer program product, the computer program product being embodied in a non-transitory computer readable storage medium and comprising computer instructions for:

determining a group of related messages that are identified as malicious based at least in part on identified behavior detected based on a plurality of messages of the group of related messages, wherein the identified behavior comprises a determination of whether a message send rate for a sender domain of the plurality of messages of the group of related messages exceeds a first threshold but is below a second threshold, the message send rate comprising a number of different recipients that the sender domain has sent messages to, the messages comprising a set of messages where each message of the set of messages has subject text with a measure of similarity above a similarity threshold to subject text of each other message in the set of messages;

receiving information associated with a received message;

determining whether the received message has the identified behavior and is a part of the group of related messages by having a subject text with a current measure of similarity above the similarity threshold to the messages in the group of related messages, and wherein determining that the received message is a part of the group of related messages further comprises determining that the received message failed at least one of Sender Policy Framework (SPF) or Domain-Keys Identified Mail (DKIM) authentication checks, and that the sender domain of the received message publishes a Domain-based Message Authentication, Reporting and Conformance (DMARC) policy requiring enforcement; and based on a determination that the received message has the identified behavior, is a part of the group of related messages by having the subject text with the current measure of similarity above the similarity threshold to the messages in the group of related messages, and that the received message failed at least one of SPF or DKIM authentication checks while the sender domain publishes an enforcing DMARC policy, performing a security action for the received message.

* * * * *